United States Patent [19]

Bourke

[11] 4,452,465
[45] Jun. 5, 1984

[54] CAMPING TRAILER AND AUTOMOBILE-TRAILER COMBINATION

[75] Inventor: Robert E. Bourke, Westport, Conn.

[73] Assignee: NBS, Inc., Lakeview, Ohio

[21] Appl. No.: 270,620

[22] Filed: Jun. 4, 1981

[51] Int. Cl.³ .......................... B60D 5/00; B62D 53/06
[52] U.S. Cl. ................................ 280/403; 280/460 R;
                                              280/492; 296/166; 296/168
[58] Field of Search .................. 280/403, 424, 460 R,
           280/492; 296/166, 164, 165, 167, 168; D12/101,
                                                103, 104; 105/15, 18

[56] References Cited

U.S. PATENT DOCUMENTS

| | | | |
|---|---|---|---|
| 2,198,270 | 2/1937 | Maranville | 280/460 R |
| 3,547,480 | 12/1970 | Ward | 296/164 |
| 3,586,119 | 6/1971 | Chuchua | 180/14 R |
| 3,638,991 | 2/1972 | Hathaway | 105/18 |
| 3,817,545 | 6/1974 | Ward | 280/638 |
| 3,843,158 | 10/1974 | Schwellenbach | 280/403 |

FOREIGN PATENT DOCUMENTS 2901435  7/1980  Fed. Rep. of Germany ... 280/460 R

Primary Examiner—John A. Pekar
Assistant Examiner—D. Lynn Fugate
Attorney, Agent, or Firm—Robert E. Stebens

[57] ABSTRACT

A camping trailer is provided having a configuration to cooperatively combine with a towing automobile to integrate interior compartments and spaces of each into usable space. The trailer has a wheeled chassis provided with a forwardly extending tongue assembly and hitch assembly for interconnecting with the towing automobile and carrying a body structure having a front end portion configured to detachably interconnect with the rear end of the automobile. The front end portion has a front wall surface inclined upwardly in a forward direction to complement an opposed rear wall surface of the towing automobile and is provided with a flexible bellows that is detachably secured to the towing automobile around a rear hatch-type door of the automobile. An opening in the front wall surface of the trailer body structure permits opening of the rear hatch door of the automobile by swinging movement of the door through the opening and into the interior of the trailer thereby enabling combined use of the interior spaces. The hitch assembly is disposed at a longitudinally intermediate point of the trailer's inclined front wall surface to minimize the extent of relative swinging of the trailer portions adjacent the automobile. The top of the trailer body structure slopes upwardly in a rearward direction from the point of connection with the automobile to enhance aerodynamic efficiency while being towed. The top also incorporates a convertible construction to permit expanding the top from a lowered more aerodynamically efficient transport configuration to an expanded configuration provided greater interior head room and accessibility to interior components.

50 Claims, 17 Drawing Figures

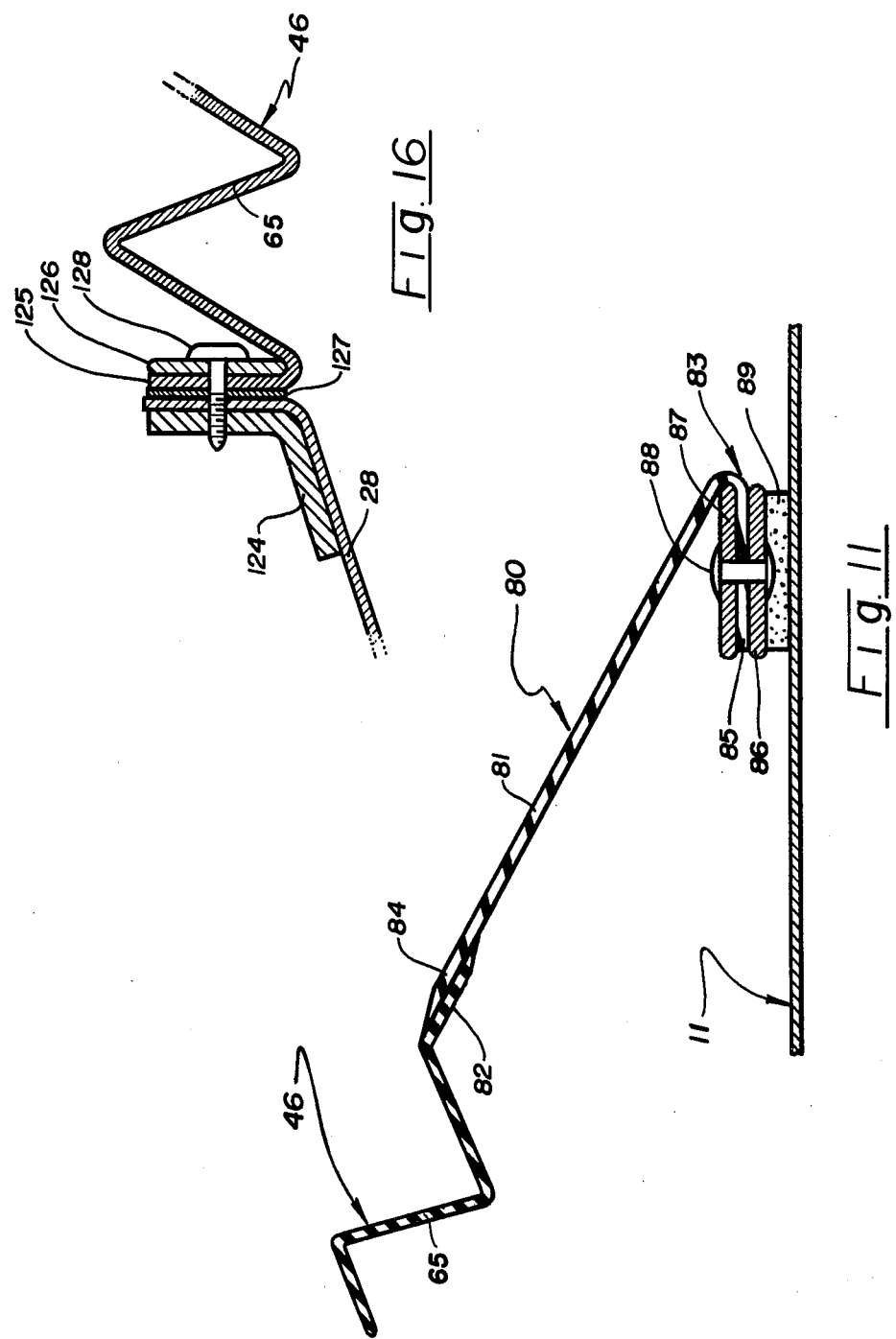

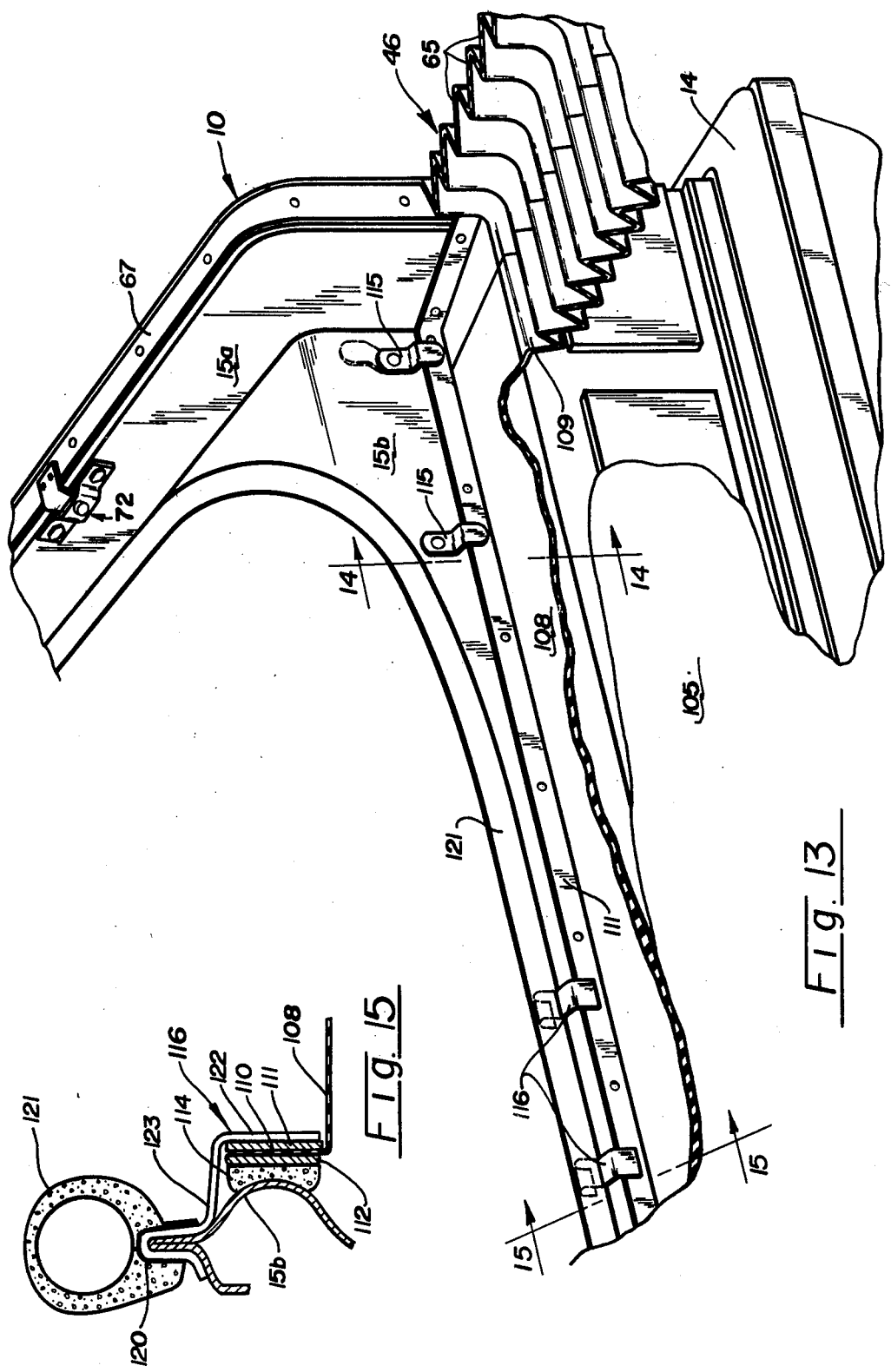

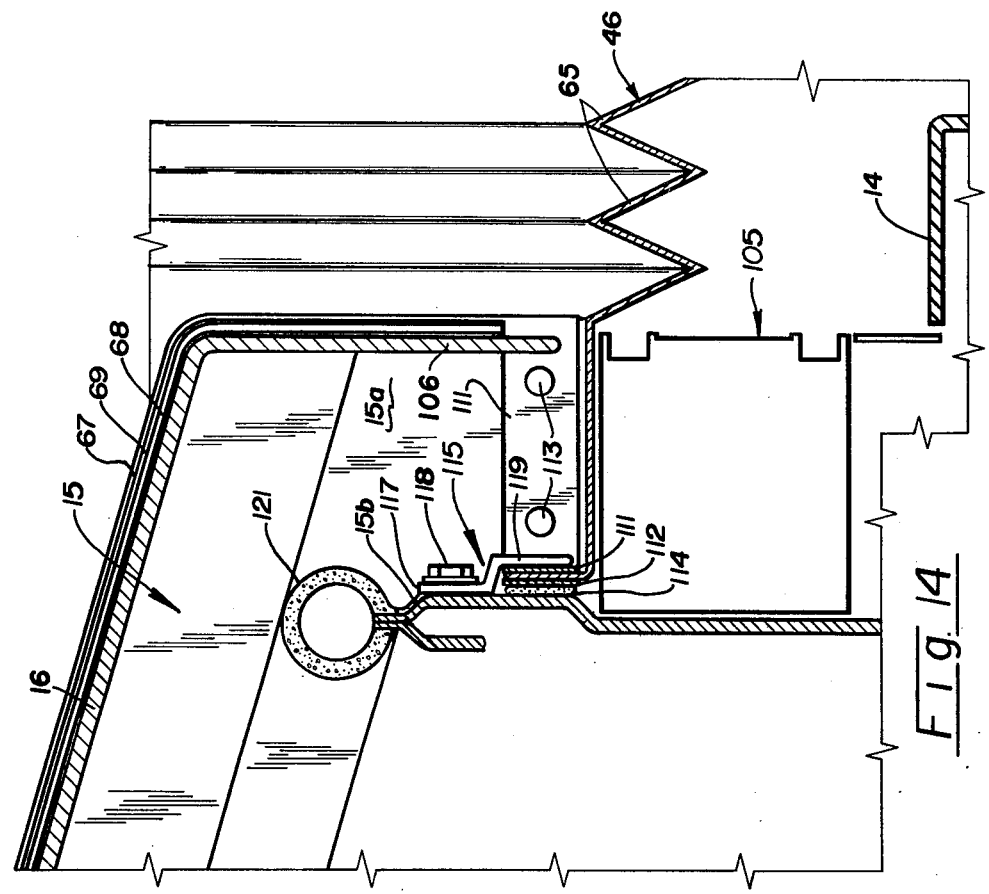

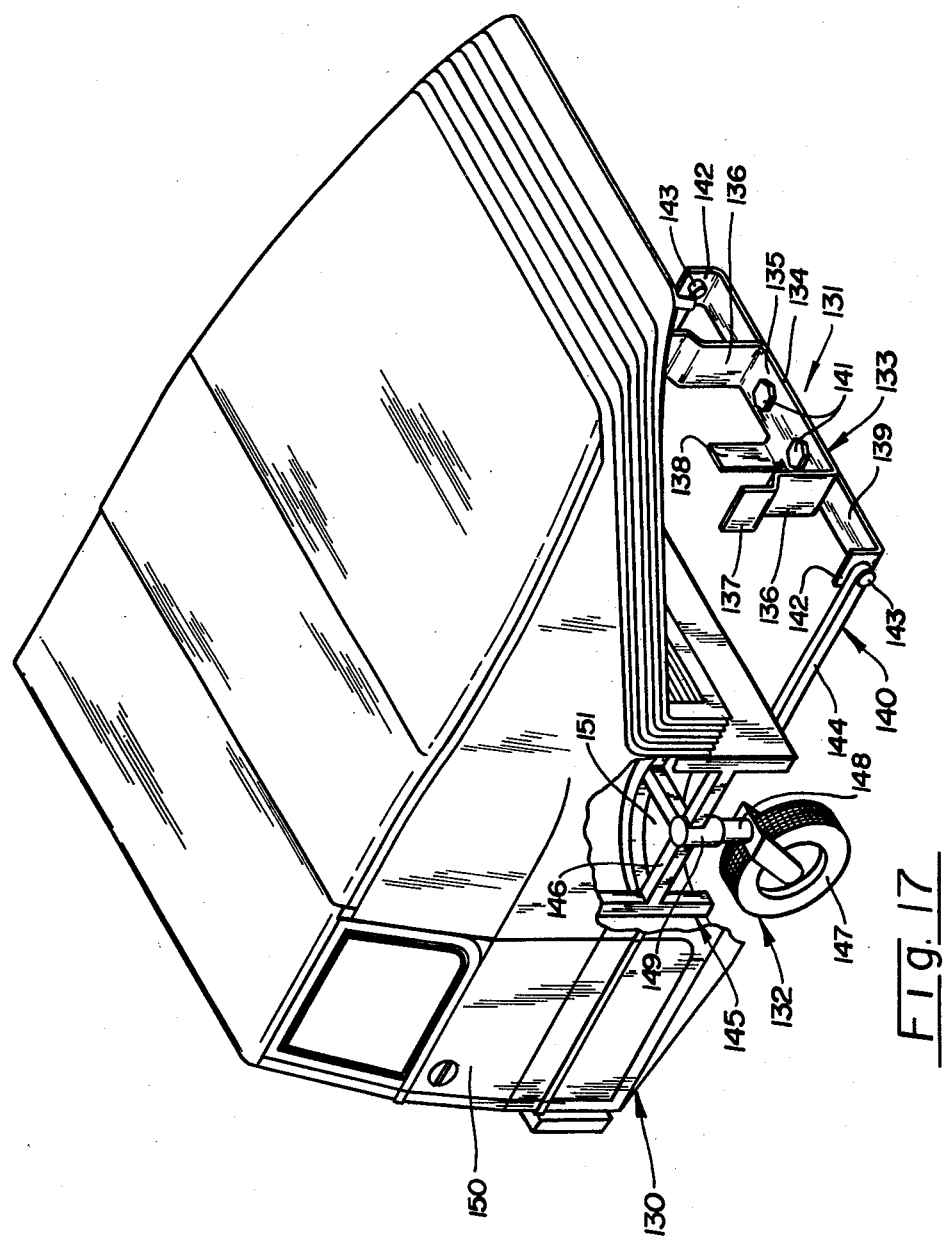

CAMPING TRAILER AND AUTOMOBILE-TRAILER COMBINATION

FIELD OF THE INVENTION

This invention is related to camping or travel trailers of the type adapted to be towed by automobiles and function as mobile homes. It relates more specifically to a camping trailer which, when coupled with a towing automobile, is capable of cooperation therewith for integrated, cooperative utilization of interior space or compartments of the trailer and automobile.

BACKGROUND OF THE INVENTION

Camping trailers or the mobile housing units heretofore provided have generally fallen into three basic type categories. The primary type is the self-contained, wheeled trailer that is adapted to be pulled by an automotive vehicle. Such a trailer is essentially independent as to its structure and function with only a mechanical connection for attachment to a vehicle for towing purposes and perhaps electrical connections to utilize electrically controlled brakes and lights that are powered and controlled from the towing vehicle. These self-contained trailers are provided in many different sizes depending upon the number of occupants desired to be accommodated and other living facilities that may be desired in any particular instance by the particular owner or user. A second major type of camping unit is that which is adapted to be mounted on and directly supported by an automotive vehicle. These units are commonly of the type adapted to interfit with a pick-up type truck body, although many are also adapted to interfit with a conventional passenger automobile body. These units are generally of a smaller type and capacity than self-contained units, although some may be sufficiently large as to require auxiliary supporting wheels to minimize the weight added to the primary automotive vehicle. A third type of mobile home or camping unit is the more recently developed type designated as a recreational vehicle and is fully self-contained as to the living quarters and the motive power system. These units in general are relatively large and are a single purpose type of vehicle.

Several problems are associated with the three basic types of camping trailers or camping units heretofore provided and, while these problems do not detract from their essential basic functional use, they nevertheless are of a practical nature requiring consideration. One major factor is that the units heretofore provided, such as the self-contained trailers or the self-contained recreational vehicles, are generally of a very large size, and thus, they require a large towing vehicle as to the self-contained trailer or the motive power system must be comparatively large in the recreational vehicle type. Also, a disadvantage of the self-contained recreational vehicle is that it is a single purpose vehicle and if additional or secondary transportation is desired, this must be provided by other vehicles that are either obtained at the temporary location of the vehicle or must be carried with the recreational vehicle.

The camping units which are designed for direct mounting onto a carrying vehicle such as a pick-up truck have the advantage that they are not then considered to limit that vehicle to a single purpose. However, during the time that a carried-type of unit is mounted on a vehicle, that vehicle then has the limited functional disadvantage of the fully self-contained recreational vehicle.

Another major factor to consider with respect to the previously provided types of trailers or camping units is that these units must be of a relatively large size in that the unit itself must provide all of the space necessary to house the occupants. The towing vehicle or carrying unit is generally limited to that function and, in the case of either the self-contained trailer or the mounted-type of unit, there is no effective utilization of the space in the transporting or towing vehicle for a housing function in cooperation with the trailer or camping unit. This particular problem is not associated with the fully self-contained recreational vehicle which is a single purpose, totally integrated type unit.

While the camping trailers and camping units heretofore provided are entirely utilizable in their intended functions, with recognition of their respective limitations, there has been a recent and very significant change in passenger-type automotive vehicle design. This change is that a greater number of such automotive vehicles are of a much smaller size than formerly available while it is the larger sizes of vehicles that are required for towing or carrying of these camping trailers or camping units of the heretofore provided designs. The automotive vehicles that now form a larger share of the market are of the compact or subcompact sizes and these are generally inadequate from the standpoint of physical size and engine power to tow a trailer of the conventional sizes and configurations. Consequently, for those desiring to maintain their activities requiring use of camping or travel trailers, it has become necessary to consider obtaining of a second vehicle, which is of a size and engine power to be capable of towing the larger size trailers or to carry a camping unit. Alternatively, it has become necessary to consider obtaining a recreational vehicle as a single purpose, self-contained unit. Again, the economics of the recreational vehicle are such that this alternative is essentially not available to many people because the financial aspect is prohibitive. The objective of obtaining a small compact car is for purposes of economy and thus the obtaining of either the recreational vehicle or a larger automobile or pick-up truck presents an unacceptable solution to the problem.

With the advent of the smaller sized automotive vehicle for purposes of economy, the problem presented to those interested in maintaining their camping or travel trailer operations has been essentially insurmountable as the units heretofore available where not adaptable to the small size economy cars. It is this problem that has prompted the development of a compact, and lightweight trailer such as that provided by this invention and which integrates with the towing vehicle for maximum utilization of the interior compartment space of trailer and towing vehicle. The trailers of this invention through their aerodynamic configuration are adaptable to and conform with the towing capacities and the economy of operation of smaller automotive vehicles.

SUMMARY OF THE INVENTION

In accordance with this invention, a camping or travel trailer is provided which is of a size and functional configuration such that it may be cooperatively combined with a small sized automotive vehicle and, in cooperation with that vehicle, provide an adequate interior space for the occupants while minimizing the actual physical size of the trailer. The unit is provided as a trailer in the sense that its weight is essentially carried on its own wheeled axle while the unit is attachable to an automobile for purposes of towing. However, the trailer of this invention embodies a construction such that the interior compartments of the trailer and towing vehicle may be integrated or combined to form a larger, more fully utilizable space for the occupants. Additionally, the trailer is provided with a convertible-type top to further minimize its effective size when in a transport configuration with the top lowered or collapsed while being towed but which, upon reaching a camping site, may be expanded to increase the interior space. The advantage of the collapsible feature is that the the trailer becomes more aerodynamically configured, and thereby, minimizes its resistance to air flow, and thus tends to minimize the power that is required to be expended by these towing vehicles and further enhancing operating economy.

An example of the general type of vehicle with which a trailer of this invention is specifically designed to function is the General Motors hatchback car of the X-body design. These vehicles are of configuration wherein the rear of the vehicle is sloped without the usual trunk configuration and the rear is provided with a relatively large door. Such a car configuration is generally designated as a hatchback style in that the rear door is pivoted at its upper horizontal edge for vertical swinging movement to an upwardly inclined, open position. By alteration of certain dimensions, but not the basic design principles of the trailer or its bellows and hitch ciomponents, a trailer embodying this invention can be adapted to fit the majority of vehicles provided with rear end access doors that are sold by other U.S. and imported car manufacturers.

The camping trailers of this invention are also configured to have a forward end configuration which will adapt to the rear configuration of a particular type of towing vehicle. The objective of this configuration is to enable providing of a flexible seal interconnection in the form of a bellows structure as between the trailer and the rear end wall of the vehicle with respect to the hatchback door. This is accomplished when necessary via dimensional size modification and reconfiguration of fowardly projecting portions of the trailer front, the bellows structure and its attachment components and hitch components to assure proper fitment to any selected one of the different manufacturers' automobiles. Such interconnection of a trailer and towing vehicle results in an integrated structure that permits the towing vehicle's rear hatch door to be open when the trailer is interconnected with the vehicle. This construction thus enables the interior compartments of the trailer and the vehicle to be integrated and cooperatively utilized in a manner such that the total usable space of the combined units is larger than the respective compartment spaces associated with either the trailer or the automotive vehicle.

The trailer is provided with a hitch connection which cooperates with the towing automobile in a manner to minimize the weight that would be transferred and carried by the vehicle while enabling the trailer to be fully articulated for displacement both laterally and vertically with respect to that vehicle. This hitch arrangement in combination with the bellows-type sealing interconnection enables the trailer to readily follow the automobile while maintaining the sealed interconnection. In accordance with this invention, the location of this interconnection or hitch point is designed to minimize the extent of lateral relative displacement between the trailer and vehicle which would otherwise be occasioned as a consequence of the inclined surface of connection with respect to the rear of the automobile. The inclined surface at the juncture of the trailer and automobile may comprise a substantial horizontal extent and the pivot point for the hitch is located longitudinally intermediate with respect to that horizontal component, thereby resulting in lateral displacement in opposite directions of those portions of the trailer that extend relatively forward and rearward of that pivot point. This location of the hitch pivot point reduces the maximum extent that any part of the trailer must be displaced or would be displaced with respect to the towing automobile whether in a horizontal or vertical direction. Additionally, the hitch structure is provided with spring biasing mechanisms interconnected between the automobile and the trailer so as to be functional in reducing the tendency of the trailer to laterally sway during towing operations.

A modified embodiment of the trailer provides for articulated displacement only in a vertical direction, that is, pivoting movement is about a horizontal axis. This results in a simplified hitch connection and providing of a castered wheel undercarriage for the trailer enables the interconnected towing automobile and trailer to accommodate turns.

These and other objects and advantages of this invention will be readily apparent from the following detailed description of illustrative embodiments thereof and having reference to the accompanying drawings showing embodiments.

DESCRIPTION OF THE DRAWING FIGURES

FIG. 11 is a fragmentary vertical sectional view on a still further enlarged scale taken along line 11—11 of FIG. 10.

FIG. 13 is a fragmentary perspective view of the bellows attachment to the bottom right corner of the rear hatch opening of the automobile.

FIG. 14 is a fragmentary vertical sectional view on an enlarged scale taken along line 14—14 of FIG. 13.

FIG. 15 is a fragmentary vertical sectional view on an enlarged scale taken along line 15—15 of FIG. 13.

FIG. 16 is a fragmentary horizontal sectional view on an enlarged scale taken along line 16—16 of FIG. 3.

FIG. 17 is a perspective view of a modified camping trailer embodying this invention, but which is provided with a castered wheel assembly.

DETAILED DESCRIPTION OF THE ILLUSTRATIVE EMBODIMENT

Figure 1:
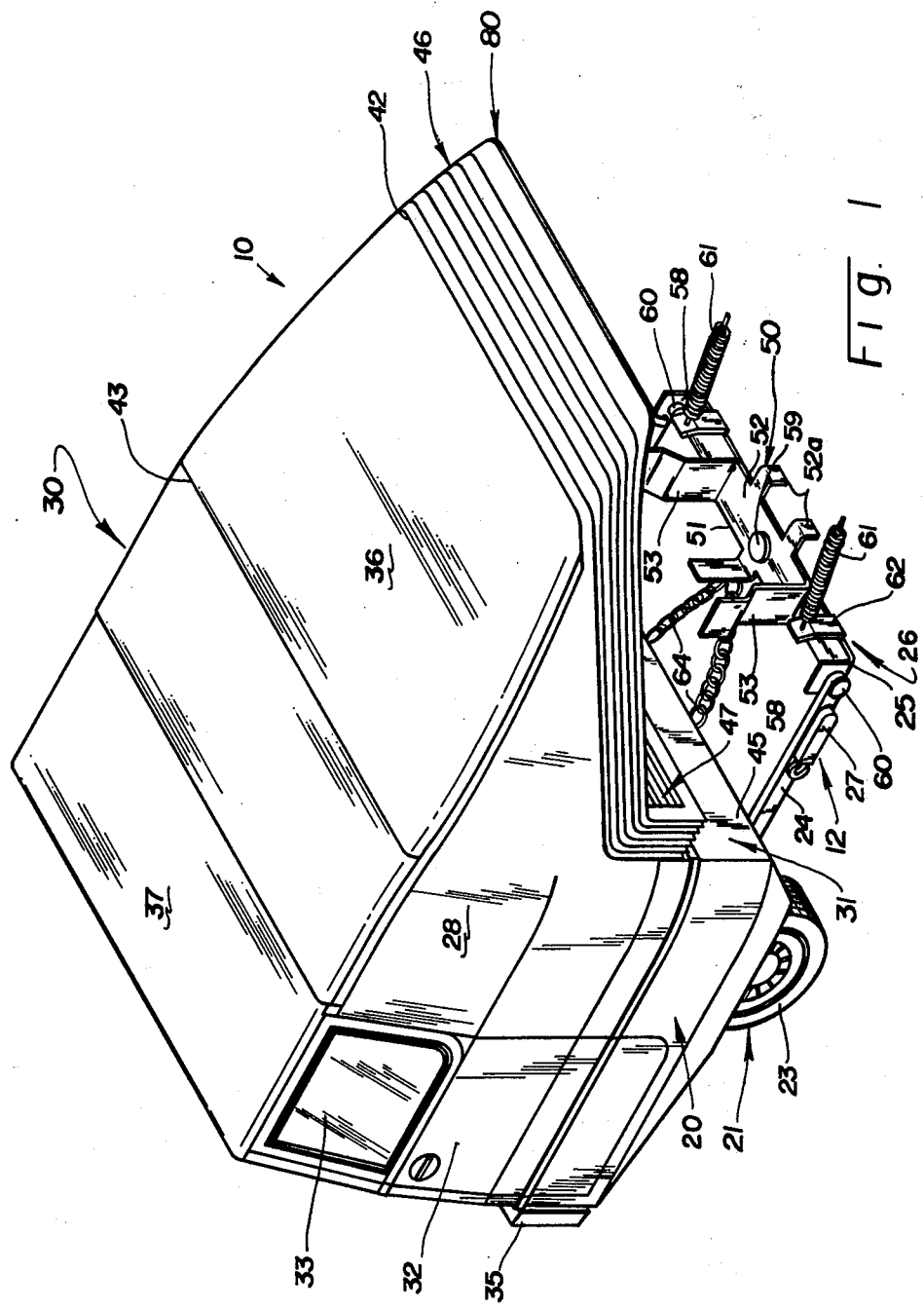
FIG. 1 is a perspective view of a camping trailer embodying this invention with the trailer shown in a transport configuration with the convertible top thereof in its lowered configuration.
Figure 2:
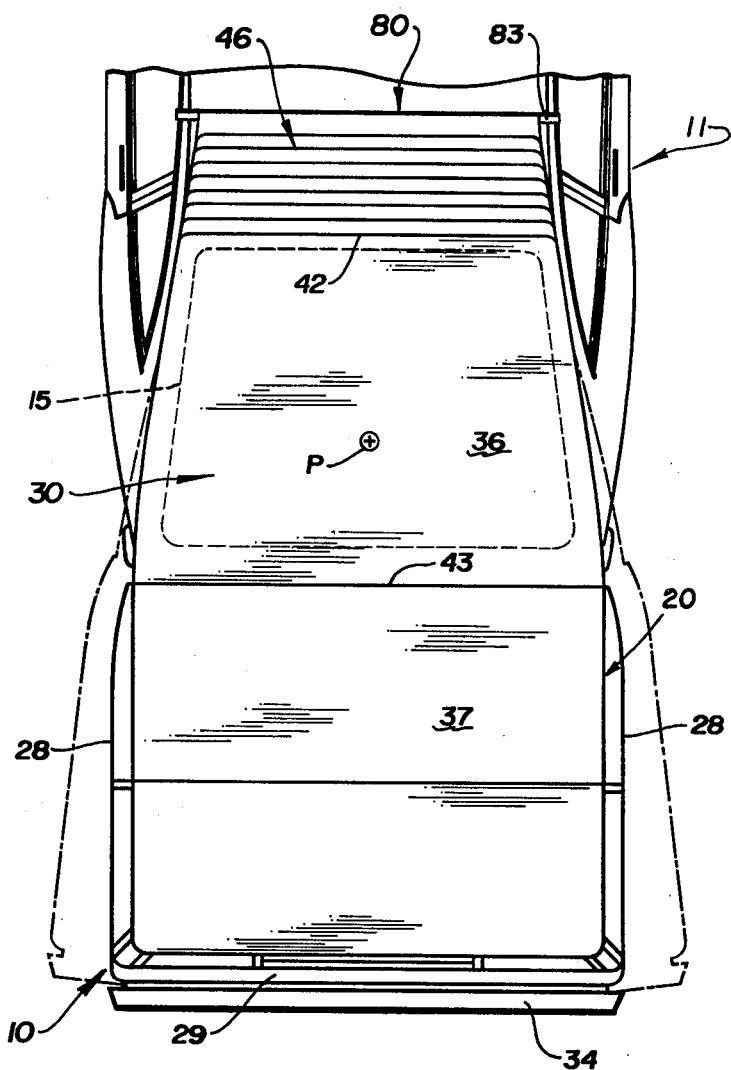
FIG. 2 is a top plan view of the camping trailer shown attached to a towing automobile with pivotal lateral displacement relative to the automobile shown in broken lines.
Figure 3:
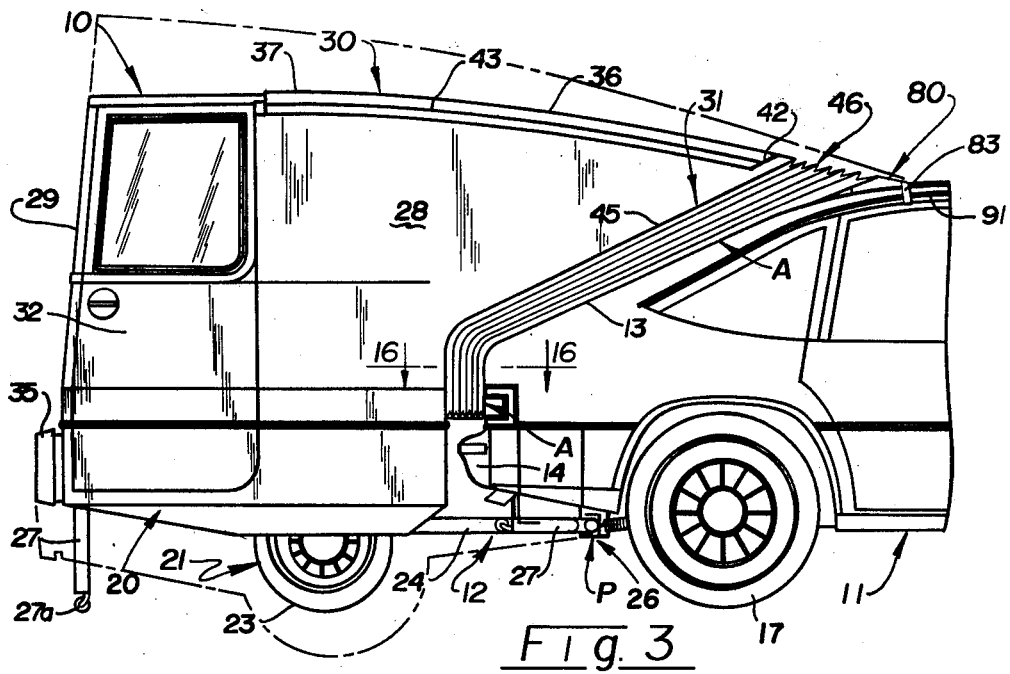
FIG. 3 is a right side elevational view of the camping trailer shown attached to a towing automobile and shown in a transport configuration with vertical pivotal displacement relative to the automobile shown in broken lines.

Having reference to the drawings, a camping trailer 10 embodying this invention is shown in FIG. 1 as separated from a towering vehicle such as an automobile of the type presently marketed as a compact car of the hatchback style configuration. Interconnection of the camping trailer 10 with an automobile 11 of the described type is shown in FIGS. 2 and 3. Further details of the mechanical interconnection are shown in other figures of the drawings, although the basic tongue assembly 12 of the trailer is shown in FIG. 1. An automobile 11 with which the camping trailer 10 is particularly designed to be utilized has a configuration such that the body terminates in an inclined rear surface or wall 13 and a bumper section 14. The inclined rear surface 13 is provided with a relatively large opening 15 as indicated in broken lines in FIG. 2 and extends between points A—A indicated in FIG. 3. This opening 15 is provided with a door or hatch 16 which is shown as pivoted to an open position in FIG. 6 of the drawings. These vehicles are of a general configuration such that the rear portions are of the illustrated type, although there may be variations as between various models or manufacturer's styles.

The general configuration of the illustrated vehicle may be characterized as including an inclined rear surface and a bumper section. It will also be noted that a vehicle of this configuration has the rear axle assembly 17 positioned relatively forward of the bumper section 14 and that the point of attachment of the tongue assembly 12 is advantageously located below and directly in front of the rear bumper with elements of the tongue assembly underlying the rear outboard corners of the towing vehicle's body. The point of attachment is indicated in FIG. 3 as being a pivot point P. Specifics of the tongue assembly and its attachment will be described in greater detail and the mechanical structures are also illustrated in greater detail in other figures of the drawings.

Looking at FIGS. 1-5 of the drawings, it will be seen that the camping trailer 10 includes a body structure 20, a transporting axle assembly 21 and the tongue assembly 12. The transporting axle assembly 21 is a conventional structure that includes a transverse axle 22 having a pair of wheels 23 that are mounted on opposite respective ends of the axle. The axle is preferably secured by a spring and shock absorber assembly to a bottom chassis or frame of the trailer, neither of which chassis or frame is specifically shown in the drawings as they comprise well-known and conventional components. It will also be understood that the chassis or frame is considered to include those structures termed "uni-body" wherein the chassis or frame is an integral part of the total body structure and the term chassis is used in this description to include structures that are more properly described as a trailer frame or a uni-body. Secured to this frame or chassis is the tongue assembly 12 which includes a pair of elongated arms 24 that may be formed from tubular bars and which extend a distance relatively forward of the transporting axle assembly. Pivotally secured to the extreme forward ends of the arms 24 is a transverse support bar 25 which is incorporated in a hitch assembly designated generally by the numeral 26 and adapted to be secured to the frame of the automobile in a manner to be described in further detail. The specific mechanical construction of the chassis of the trailer is not shown, but it will be understood that the elongated arms 24 of the tongue assembly are mechanically connected to the chassis by appropriate means to form a rigid, integral structure that does not require further detailed explanation to provide a complete understanding of the basic structure arrangement.

The trailer 10 is designed to be uncoupled from a towing automobile for storage or for other purposes. Accordingly, the structure is provided with auxiliary supporting legs 27 that are designed to provide stability in maintaining the trailer in the illustrated horizontal position of FIG. 3. Four such legs 27 are provided with two of these legs being pivoted to the respective elongated arms 24 of the tongue assembly and two other legs being secured to the underlying chassis of the trailer body and disposed rearwardly of the transporting axle assembly 21. One of the latter two supporting legs is shown in FIG. 3 in a downwardly projecting position as for supporting of the trailer while the friont leg is shown in a transport position. It will be understood that with the trailer attached to a towing vehicle, such as the outlined automobile 11, the rear supporting legs 27 would also be pivoted to a horizontal or stowed position such as in the case of the forward supporting legs. Suitable latching devices (not shown) are provided to secure the legs in either position. The illustrated legs are also provided with small castered wheels or rollers 27a to facilitate handling of the trailer when separated and disconnected from the automobile.

The body structure 20 is of a shell-like configuration having longitudinally extending and opposed side walls 28, a rear end wall 29, a convertible top 30 and a front section 31. One of the side walls 28 is provided with a door 32 as is shown in FIG. 3 with the opposite side wall (not shown) and rear end wall 29 being provided with one or more window units 33. It will also be noted that the rear end wall 29 is provdied with devices such as the necessary lights 34 that are required for vehicles and a protective bumper 35. Other specifics of the body structure, except the convertible top 30, are considered to embody known mechanical structures and construction or fabrication techniques and thus do not require further detailed illustration or description.

Figure 6:
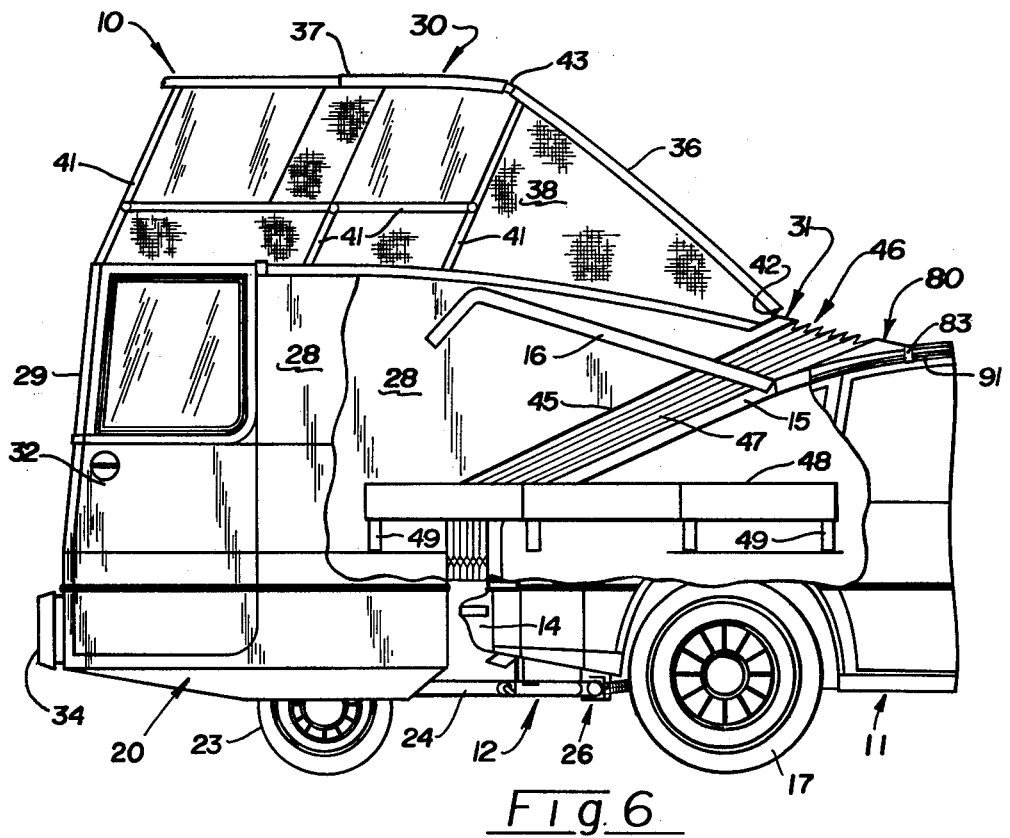
FIG. 6 is a right side elevational view of the camping trailer with the convertible top raised to an expanded configuration and with wall portions of the trailer and towing automobile broken away to better show cooperative relationships.
Figure 4:
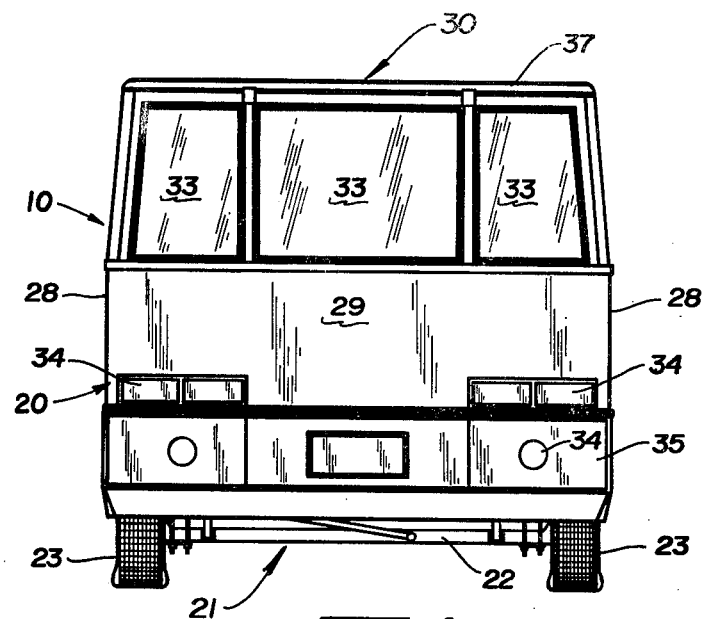
FIG. 4 is a rear elevational view of the camping trailer shown in a transport configuration.
Figure 5:
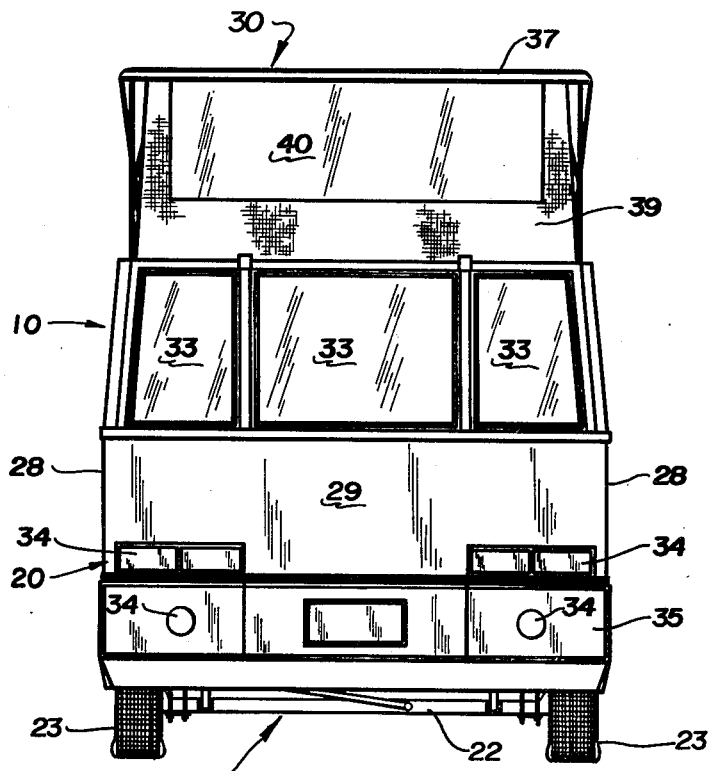
FIG. 5 is a rear elevational view of the camping trailer with the convertible top raised to an expanded configuration.

The body structure 20 of the trailer of this invention is advantageously constructed with a convertible-type top 30 which may be selectively positioned in either a transport configuration such as that illustrated in FIGS. 1, 2, 3 and 4 or in an expanded configuration such as that shown in FIGS. 5 and 6. This collapsible feature enables the interior space of the trailer to be substantially enlarged when it is desired to enter and functionally occupy the trailer. Accordingly, the top 30 is formed with front and rear panel sections 36 and 37 which are joined by hinge mechanisms in a manner to permit relative pivoting of these sections and swinging displacement with respect to the basic body structure of the trailer. Also included in the top 30 are flexible side wall elements 38 and a flexible rear wall 39 which serve to maintain a closed structural assembly as between the rigid top and the rigid side and rear walls of the body. These flexible walls which are secured to the trailer to form whether and air-tight seals with the body structure thereof may be formed from suitable material such as the vinyl-type plastics that are readily available and if desired, the side elements 38 and rear walls 39 may be provided with respective transparent panels or screens 40. The mechanism for interconnecting the front and rear panels 36 and 37 of the top 30 to the body is illustrated as comprising a set of pivotally interconnected bars 41 which either provide the necessary support for maintaining the top sections 36 and 37 in the elevated position of FIG. 6 or which, alternatively, can be displaced to a position where those sections are lowered to a transport configuration as shown in FIG. 3. It will be seen most clearly in FIG. 6 that the front panel 36 is pivoted at its forward most end to the front section 31 of the trailer by a transversely extending hinge structure 42 and at its rearward transverse end edge to the rear panel 37 by another hinge structure 43. This construction results in a substantially greater amount of head space being obtained at the rear of the trailer where is is most desired and useful. It will be noted that the front panel 36 is inclined upwardly and rearwardly over that portion where head room is not essential, but the rear panel 37 is substantially horizontal in its elevated position, thus providing the desired head room over that area of the trailer where it is most desired. The upwardly inclined front panel 36 is of advantage not only for aerodynamic reasons, but provides the necessary space to permit full opening of the hatch door 16 even when the top 30 is in the transport configuration shown in FIG. 3. Further specifics of this convertible top operating mechanism are not illustrated or described as they do not form an integral part of the basic trailer configuration andtrailer/towing vehicle combination which is the subject of this description.

The collapsible configuration and construction of the body structure 20 as to the top 30 has the particular advantage of enabling one to minimize the exterior configuration of the trailer when the top is in a collapsed configuration, as is shown in FIGS. 1, 2, 3 and 4 and to thereby reduce resistance to air flow and result in improved aerodynamic efficiency of the integrated trailer and towing vehicle combination. This is an important factor in the design of the illustrated body structure configuration in that the power required by the automobile 11 will be accordingly minimized for towing of a trailer of this type where such consideration is given to aerodynamic efficiency. In this collapsed transport configuration, as can be seen through comparison of FIGS. 3 and 6, the effective vertical forwardly facing area presented to air flow over the top of the automobile is significantly reduced, and thus, directly contributes to a reduction in air resistance that would otherwise be experienced. This advantage of reduced resistance to air flow is further enhanced aerodynamically by configuring the top 30 such that its uppermost surface will be most advantageously aligned with and form a continuation of the upper body surfaces of the automobile. While the top 30 forms a continuation of the automobile, it is inclined upwardly and rearwardly in accordance with trailer design concepts to provide greater interior space in the trailer, but without significant degradation of aerodynamic air flow. This trailer configuration results in a greatly improved air flow over the integrated top surfaces of the trailer and towing vehicle as compared to that experienced with the conventionally separated trailer and towing vehicle combinations.

As previously indicated, one of the important objectives of the structural configuration of the camping trailer and its combination with the automobile 11 in accordance with this invention is to provide for an integration of the respective interior space or compartments of the trailer and the automobile. Accordingly, the front section 31 of the trailer is designed to have a configuration that is complementary to the inclined surface of rear surface 13 of the automobile and to the bumper section 14 of such vehicle. While being complementary to the towing vehicle in its configuration, it will also be noted that the trailer's front section 31 is disposed relative to the tongue assembly 12 and hitch assembly 26 such that front wall defining elements or mounting surfaces thereof, such as the illustrated lower vertical panel 45, are in relatively spaced relationship to the opposed rear wall surfaces 13 of the automobile. This space between those opposed surfaces, which may be of the order of eight inches, is then closed by a flexible bellows assembly 46 which forms a continuation surface with respect to the trailer side walls 28 and a continuation surface with respect to the top panel 36 and the surfaces of an automobile to which the trailer may be connected. The central area of the front section 31 is open to the interior of the trailer and has a central opening 47 which is peripherally circumscribed by the flexible bellows and is of a size which is at least commensurate with the hatch opening 15 of the automobile and sufficiently large to permit passage therethrough of the door 16. This arrangement can be seen by reference to FIGS. 2 and 6. It will also be noted that the central opening 47 is substantially equal in size to the frontal area of this front section 31 and that, essentially, there is no front wall except for those elements that provide a mounting surface 45 for the bellows assembly 46 as will be described in greater detail with reference to FIG. 16. However, for convenience in describing the illustrative embodiments, the front section 31 is described as having a front wall defining surface 45 that would extend transversely across the trailer body structure at the forwardmost edges of the side walls 28 and the top 30 and an otherwise undisclosed bottom floor.

Forming the front section central opening 47 with this dimension thus enables the door 16 of the automobile to be operated when the trailer is attached to the automobile. This is perhaps best shown in FIG. 6 wherein the door 16 is illustrated pivoted to an open or elevated position. The functional objective of this integrated construction is that the interior compartment space of the automobile may be combined with that of the trailer to form an enlarged space that can be more effectively utilized for the trailer's important function of providing housing for its occupants. A specific example of this is indicated in FIG. 6 wherein it is shown that a bed structure 48 may be conveniently incorporated and supported partially within respective compartments of the automobile 11 and the trailer 10. This is accomplished as a consequence of being able to open the door 16 and thus permit extension of this bed structure from the rear compartment space of the automobile and into the front portions of the trailer and supported on respective brackets or leg structures 49. This bed structure is advantageously of the folding type such that it may be collapsed into a more compact configuration and which may be stored within the interior of the automobile in the truck area when not being utilized. The specifics of the bed structure are not illustrated as the particular mechanical mechanisms do not form a part of the invention. It will also be understood that a device other than a bed structure may be provided as deemed most appropriate for a particular trailer design and its functional considerations.

Figure 7:
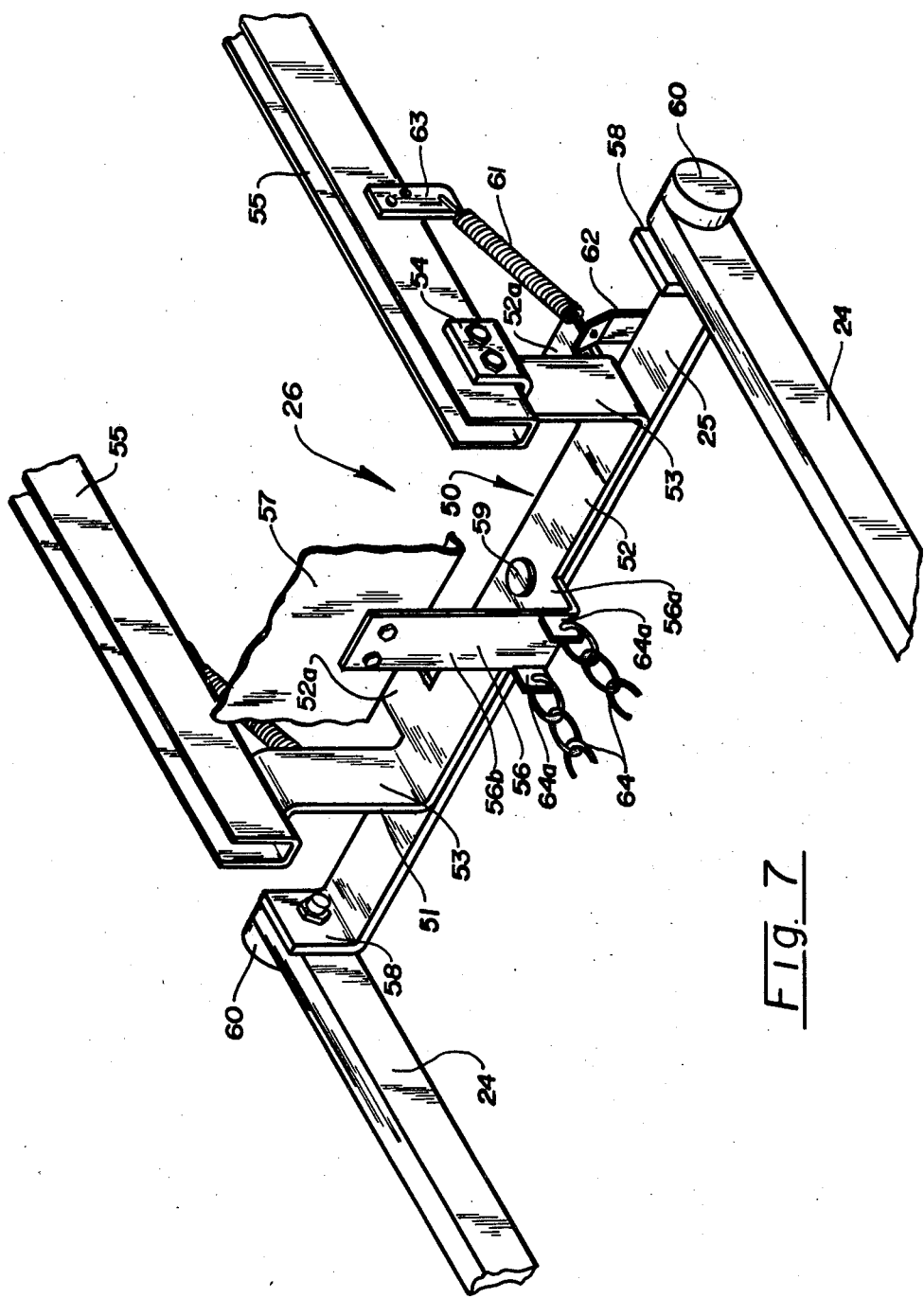
FIG. 7 is a fragmentary perspective view on an enlarged scale of the tongue and hitch assembly components with the automobile body shell and the trailer body omitted.

Further details of the mechanisms incorporated in the hitch assembly 26 can be best seen with reference to FIG. 7, considered in conjunction with FIG. 1. Included in the hitch assembly 26 is a rigid structural frame 50 adapted to be secured to the automobile 11 and to carry the transverse support bar 25 of the tongue assembly 12. This frame 50 is comprised of a U-shaped bracket 51 having a horizontally disposed, transversely extending section 52 terminating at each end in upwardly extending attachment legs 53. These attachment legs 53 are configured to have L-shaped attachment elements 54 at their upper terminal ends which are designed to interfit with and be fastened to longitudinally extending beams 55 of the automobile chassis by bolts or other suitable fastening devices or techniques. Also included in the structural frame 50 is an L-shaped stabilizing bracket 56 which has one leg 56a thereof rigidly secured to the horizontal section 52. The other leg 56b of the bracket 56 extends a distance upwardly and is adapted to be rigidly secured to a transversely extending plate or structural element 57 that is a part of the automobile's body or chassis secured to and carried at the rearmost end of the automobile and may be attached to and become unitized with the longitudinal beams 55 of the chassis. It will be noted that the rigid structural frame 50 is designed with the U-shaped bracket 51 configured such that its horizontal section 52 will be carried at an elevation sufficiently below the chassis beams 55 and structural element 57 to avoid interference with any other components of the automobile such as a spare tire well.

Attachment of the tongue assembly 12 is effected through the transverse support bar 25. This support bar 25 is of a length greater than that of the horizontal section 52 of the frame bracket 51 and is provided at each end thereof with upturned flanges 58 which are thus seen as being positioned laterally outward with respect to the vertically extending attachment legs of the structural frame 50. Pivotal mounting of the support bar 25, which bar is seen to comprise a flat plate although its underside may be provided with reinforced ribs (not shown), is accomplished by means of a pivot pin 59 that is disposed centrally of the U-shaped bracket 51 and serves to secure the bar 25 to the bracket 51 in a relatively permanent manner. The pivot pin 59 extends through the horizontal section 52 of the bracket and the support bar 25 to permit relative pivoting about a vertical axis. With the support bar 25 and the horizontal section 52 being of a plate-like form, these components will cooperate in a manner to prevent relative twisting through the limited extent of angular displacement of those components as would otherwise likely result during towing operations of the trailer. The extent of relative pivoting movement about this vertical pivot axis is indicated in broken lines in FIG. 2.

Pivotal mounting of the elongated arms 24 of the tongue assembly 12 to the flanges 58 is accomplished by respective pivot pins 60. These pivot pins extend horizontally in coaxial alignment and thus define a common horizontal pivot axis about which the arms 24 may pivot to accommodate upward or downward swinging of those arms relative to the automobile. This relative motion is indicated in FIG. 3 by the broken line representation of the trailer in either an upward or downward displaced position and which essentially maximum expected displacement illustrated could be caused by the trailer inadvertently being run over a high curbing. These pivot pins 60 are preferably of a design that will permit their easy removal and thus facilitate disconnection of the trailer from, or its attachment to, the automobile.

Another factor considered in the configuration and dimensional design of the hitch assembly 26 is the relatively limited space between the outboard, front corners of the trailer body and the inclined rear surface 13 and bumper section 14 of the automobile. To provide better handling capability, the hitch assembly 26 is provided with a pair of stabilizing springs 61. These springs 61 which are of the tension type and may be of a helical coil construction are designed to provide a counteracting force to resist lateral excursions of the trailer relative to the automobile about the pivot 59 in the absence of any actual effective turning movement of the automobile. This effect is commonly described as fishtailing and, with the construction of the camping trailer of this invention designed to form an integrated combination with an automobile, it is even more desirable that such undesired motion is effectively eliminated. Accordingly, two such springs 61 are provided as can best be seen in FIG. 7 with one end of each spring connected to the support bar 25 by a respective mounting flange 62 and each spring extends longitudinally forward along the chassis beam 55 with the other end connected to a retaining plate 63. Each of the two retaining plates 63 is secured to a respective chassis beam 55 at a point relatively forward of the point of attachment of the structural frame attachment elements 54. Also, the bracket 51 is provided with a pair of rotational stops 52a that are formed with the horizontal section 52. Each stop 52a includes a downwardly projecting lip that is at a position to intercept the bar 25 and limit the extent of its pivoting movement.

To meet vehicle safety regulations for trailers, a pair of safety chains 64 may be provided. These chains 64 as seen in FIGS. 1 and 7 are connected to the structural frame 50 by respective connector lugs 64a and to the trailer by suitable connector brackets (not shown).

An important structural element of this integrated trailer/towing vehicle combination is the flexible bellows assembly 46. This bellows assembly is relatively permanently affixed to the trailer's front section 31 and is designed to be detachably secured or interconnected with the automobile body surfaces and to form a seal with the respective surfaces to substantially prevent passage of air, water or dirt therebetween. The flexible bellows itself is comprised of a rubber or rubber-like synthetic material which is extruded, molded or heat-formed in a pleated configuration having a sufficient number of pleats 65 to allow compression and elongation of the bellows as may be required. The width of the pleats, number of the pleats and thickness of the material are determined by factors such as type of material and dimensional considerations. The bellows are permanently secured to the trailer body structure 20 and effectively form a smooth, aerodynamically efficient continuation of the trailer's side walls 28 and the top panel 36 and also extend transversely across the trailer front section 31 at a point below the central opening 47. With relatively narrow pleats, it will be seen that this central opening 47 may be relatively large and encompass nearly all of the forwardly facing frontal area of the trailer.

An opposite end pleat of the bellows assembly 46 is structurally designed to permit its detachable interconnection with the automobile. Accordingly, the longitudinally extending side portions are constructed to form a semi-rigid fastening lip 66. This structure is shown in substantial detail in FIGS. 8 and 9 of the drawings and is seen to include a pair of elongated thin sheet metal plates 67 and 68 which are disposed on opposite sides of an endmost pleat 69 of the flexible bellows. The outer plate 68 is provided on its exposed surface with a gasket 70 formed from suitable sheet material which is adapted to interface with the surface of the automobile body and form a fluid-tight seal therewith. The gasket 70 may be secured to the metal plate 68 by suitable adhesives with the two plates 67 and 68 being rigidly secured in clamped relationship to the endmost pleat 69 of the bellows by a plurality of rivets 71 or other suitable fastening devices. These plates 67 and 68 are relatively thin and are sufficiently flexible to enable the fastening lip to conform to the automobile body surface; however, it may be necessary to preform the plates to accommodate sharp breaks in the automobile body surface of some manufacturers models.

Figure 9:
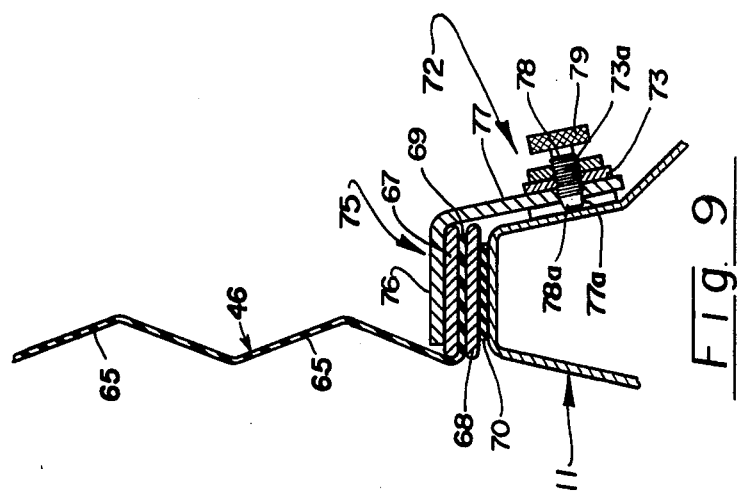
FIG. 9 is a fragmentary sectional view on an enlarged scale taken along line 9—9 of FIG. 8.
Figure 8:
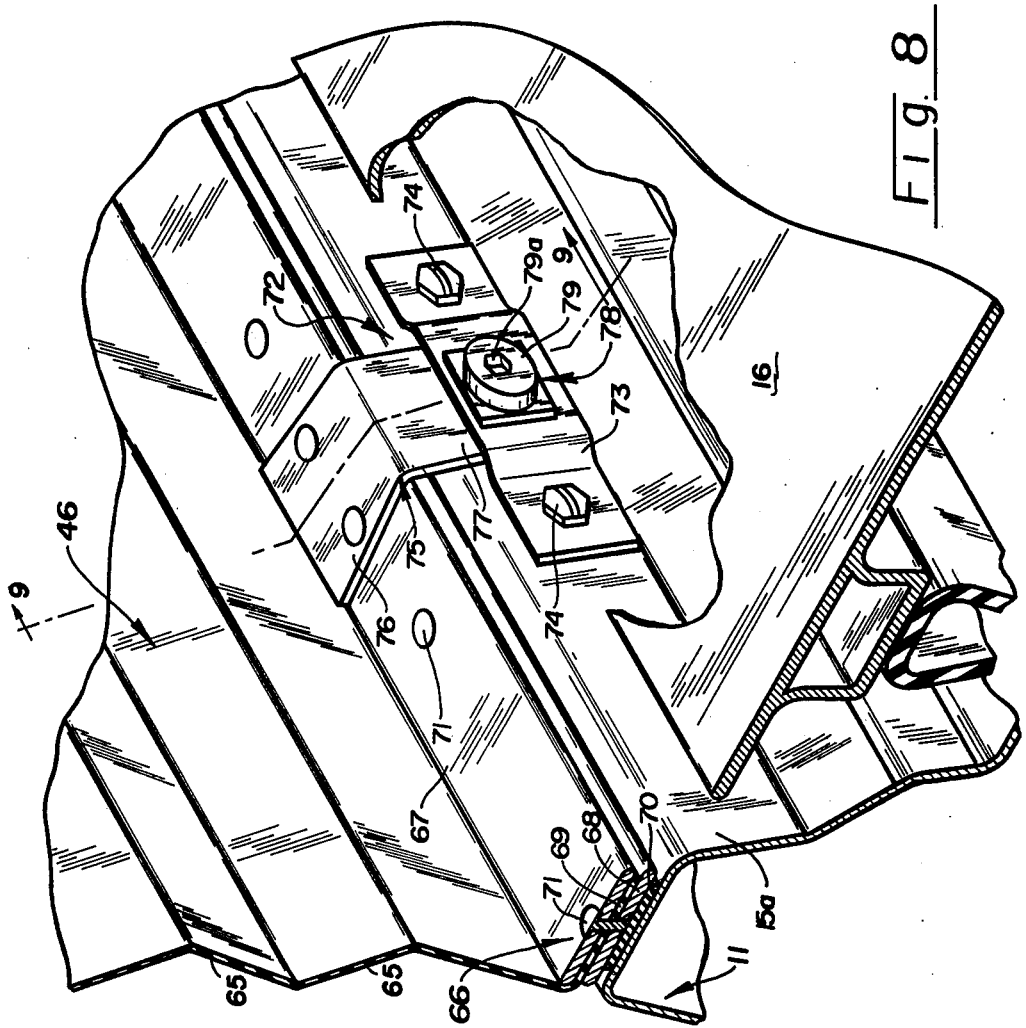
FIG. 8 is a fragmentary perspective view of the bellows attachment on a longitudinal side of the rear hatch opening of the automobile.

Detachable securing of the bellows along these longitudinal edges to the automobile body is also shown in FIGS. 8 and 9. This is accomplished by provision of mechanical latching devices 72 with approximately three of the illustrated devices provided on each longitudinal side portion of the structure. Each of these devices comprises a clamp bracket 73 which is permanently secured to a wall surface of the automobile body structure surrounding the hatch opening 15 with this particular surface portion being designated by the numeral 15a. The clamp bracket 73 is of a U-shaped configuration having a central portion thus displaced slightly away from the wall surface 15a with the opposite ends then secured to the wall surface by fastening means such as self-tapping, sheet metal screws 74. This clamp bracket 73 is not normally seen when the door 16 is pivoted to a closed position as can be readily seen in FIG. 8. It will also be noted that the door 16 may be freely operated as desired regardless of whether the bellows assembly 46 is attached to the automobile body. Detachable securing of the bellows assembly to the automobile body by means of the clamp brackets 73 is effected by an L-shaped latch plate 75 having one leg 76 thereof permanently secured to the fastening lip 66. A pair of rivets may be advantageously utilized for this purpose with those rivets extending through the latch plate leg 76 and the sheet metal plates 67 and 68. The other leg 77 of the latch plate projects a distance laterally so as to extend through the central portion of a respective clamp bracket 73 and is sufficiently thin so as to project through the small clearance between the hatch opening 15 and the door 16. This leg 77 is provided with a tapered hole 77a which is aligned with a threaded aperture 73a formed in the central portion of the bracket and through which a tapered end 78a of a threaded fastening element 78 may be extended to interengage with the tapered hole in the latch plate leg. The dimensional placement of the apertures 73a which can be seen in FIG. 9 will be readily understood to be determined by the thickness of the fastening lip 66 so as to insure that the gasket 70 will be tightly compressed into sealing engagement with the automobile body. The threaded fastening element 78 has a relatively enlarged knurled knob 79 which is provided with a socket 79a to accept an allen wrench to facilitate positive attachment of the unit.

Figure 12:
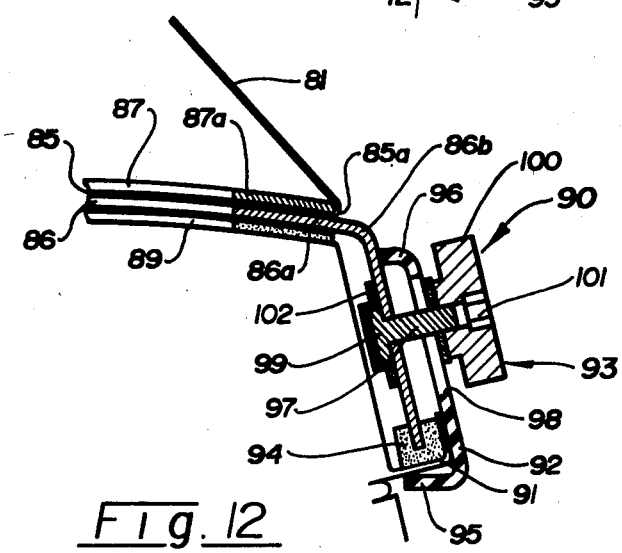
FIG. 12 is a fragmentary vertical sectional view on a still further enlarged scale taken along line 12—12 of FIG. 10.

Securing of the top transversely extending edge of the bellows assembly 46 to the top of the automobile body is accomplished in the illustrative embodiment by a header clamp assembly designated generally by the numeral 80. This header clamp assembly is shown in greater detail in FIGS. 10, 11 and 12 which illustrate the mechanism for removably securing the structure to the automobile body. Forming the header clamp assembly 80 is a header panel 81 which forms an extension of the endmost pleat 82 and a clamp mechanism 83. The header panel 81 comprises a sheet of the flexible bellows material, or other suitable material, and is secured along one transversely extending marginal edge portion 84 through adhesive bonding of that edge portion to the overlapped portion of the endmost pleat 82. Integrally formed with the panel 81 at its opposite forwardly projecting edge is an inwardly turned clamping lip 85. This clamping lip is disposed in underlying relationship to the panel and includes an extension 85a projecting along each end of the panel to an interconnecting transition junction with the endmost pleat 69 of the previously described side attachment of the bellows assembly.

Forming the clamp mechanism 83 is an elongated clamping strap 86 and an elongated compression strap 87 disposed in overlying relationship to the strap 86. The inturned clamping lip 85 projects between these two straps and is secured therebetween by a plurality of suitable fastening devices such as rivets 88 that interconnect the two straps at predetermined intervals. These rivets are applied to draw the compression strap 87 toward the clamping strap 86, thereby compressing the clamping lip 85 to form a fluid-impervious connection. Formed with each end of the straps 86 and 87 is a laterally projecting extension 86a, 87a which engages with and secures the clamping lip extension 85a of the header panel 81 therebetween by means of additional rivets. Advantageously, the straps 86 and 87 through their respective extensions, form continuations of the respective plates 68, 67 previously described with respect to securing of sides of the bellows assembly to the automobile body. Completing sealing of the header clamp assembly to the automobile body is a gasket 89 which is adhesively bonded to the bottom surface of the clamping strap 86. This gasket 89 also underlies the strap extension 86a in a similar interfacing relationship to the body and may be formed as a continuation of the side seal gasket 70. These straps also are sufficiently flexible to permit their readily conforming to the automobile body surface configuration or they may have a preformed configuration to readily adapt to relatively sharp bends in the body surface.

Detachable securing of the header clamp assembly 80 to the automobile body is effected by a connector clamp assembly 90 which is designed to permit releasable engagement with a channel-form drip rail 91 of the automobile body. Two connector clamp assemblies are provided with each assembly interconnecting with the clamping strap 86 at respective opposite ends thereof. Forming each connector clamp assembly 90 is a longitudinal extension 86b of the clamping strap 86, a channel-shaped connector 92 and a compression clamp 93. The strap extension 86b projects downwardly along the side of the body and extends into the drip rail 91. A protective end cap 94 is secured to the terminal end of the strap extension to prevent direct contact thereof with the drip rail. Formed at opposite ends of a central web of the channel shaped connector 92 are a hook flange 95 adapted to extend in underlying relationship to the drip rail 91 and a spacer flange 96 adapted to engage with the outer surface of the strap extension 86b. The compression clamp 93 includes a screw-threaded stud 97 extending through the strap extension and an elongated slot 98 formed in the web of the connector 92. The head 99 of the stud underlies the strap extension and a knurled nut 100 is threaded onto the outer end of the stud to draw the strap extension and connector together into clamped relationship with each other and the drip rail 91. A socket 101 is formed in the nut 100 to accept an allen wrench to facilitate positive attachment. A stud retainer 102 is preferably provided at the inner surface of the strap extension 86a to maintain the stud in association therewith and to prevent its rotation.

Figure 10:
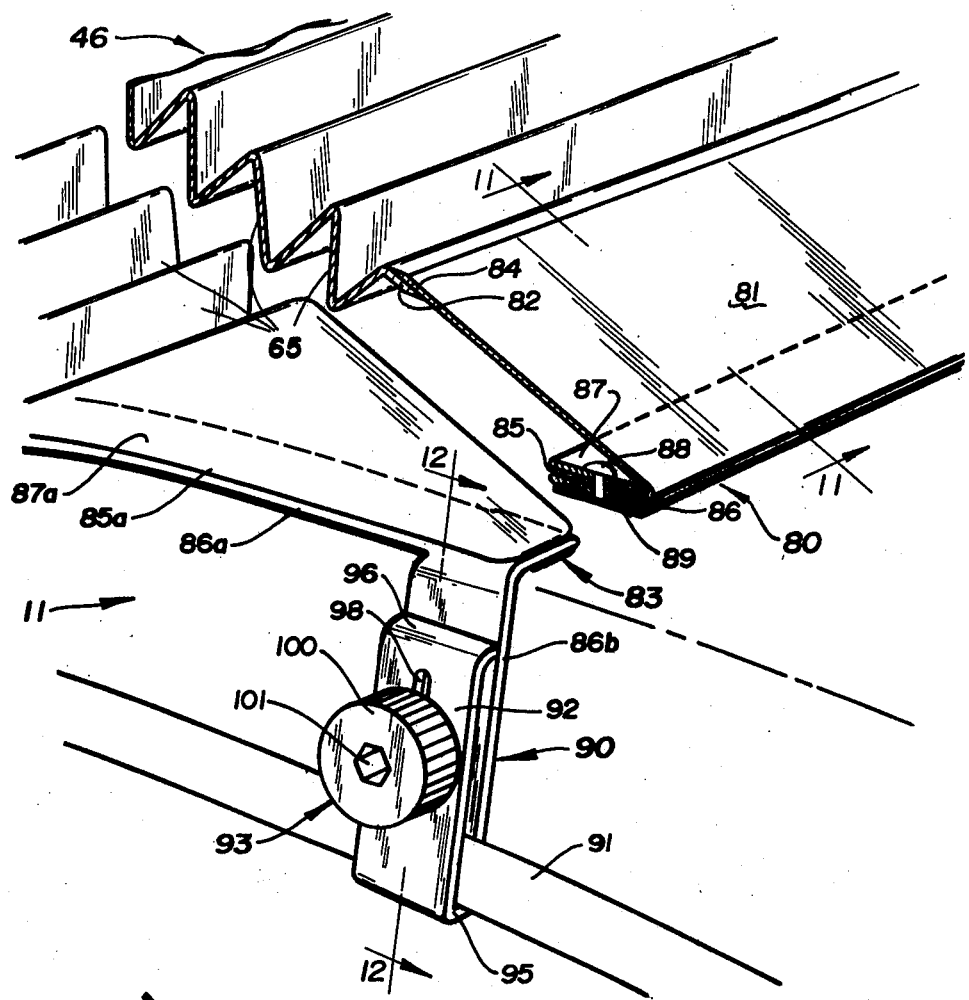
FIG. 10 is a fragmentary perspective view on an enlarged scale of an upper front corner of the flexible bellows showing attachment to the top of the automobile.

Operation of the described connector clamp assembly 90 will be readily understood by reference to FIGS. 10 and 11. At the time of attachment of the bellows assembly 46 to the automobile, the stud 97 and nut 100 would be unthreaded and the connector 92 disassembled. With the bellows assembly positioned in engagement with the vehicle body, the header clamp assembly extensions 86b would project downwardly along the side of the body and into the drip rail 91. At this point, the connector 92 would be reassembled with the stud 97 and the knurled nut 100 threaded onto the end of the stud projecting through the slot 98. The connector 92 is then relatively displaced along the clamping strap extension 86b to concurrently pull the header clamp assembly 80 down onto the automobile body and bring the hook flange 95 into contacting engagement with the drip rail 91. Such relative movement is enabled by the slot 98 through which the stud 97 may readily move. When the components are pulled into a sufficiently compressed or clamped relationship, the knurled nut 100 is turned to bring its inner face into engagement with the connector 92 to cause the spacer flange to bear against the strap extension and the protective end cap 94 to clamp the upturned lip of the drip rail between it and the web of the connector in secured relationship. Detachment is accomplished by a reversal of the attachment procedure.

Interconnection of the flexible bellows assembly 46 with the automobile body along the bottom transverse edge is effected by a sealing structure such as that which is best shown in FIGS. 13, 14 and 15. This attachment is effected by securing the end of the bellows assembly to the automobile body along a body surface 15b which is disposed interiorly of the hatch opening 15. The specific trailer configuration shown in the several drawing figures is principally adaptable to fitment on hatchback-type automobiles and, in particular, fitment on the "X" bodied series produced by General Motors. As previously stated, the illustrated trailer through modification in the attachment areas is adaptable to other models and other manufacturer's vehicles while retaining the inventive concepts and the advantageous features of this invention. In the case of the "X" bodied G.M. hatchback, the body is configured to have a taillight housing 105 which extends substantially across the rear of the vehicle. This housing is positioned vertically above the actual bumper 14 and thus forms an extension of the bumper section 14. Referring to FIG. 14 which illustrates the assembly with the hatch door 16 in a closed position, it will be seen that the hatch door is formed with a downwardly projecting lip 106 that has a bottom edge spaced from the top of the taillight housing 105 and is in spaced relationship to the body wall surface 15b forming a part of the hatch opening 15.

Attachment of the flexible bellows assembly 46 transversely across the rear of the automobile at the bottom of the hatch opening 15 is effected by a clamping plate assembly in a manner similar to that described in association with the side sealing and attachment structures. A lateral extension panel 108 is secured along one transversely extending edge thereof to the endmost pleat 109 of the bellows assembly and which pleat extends transversely across the rear of the vehicle. This extension panel 108 is of a width to project in overlying relationship to the taillight housing 105 and terminate in an upturned clamping lip 110 disposed adjacent the body surface 15b. The extension panel 108 is also provided with an upturned extension 110a of the clamping lip at each end of the panel and which extends adjacent the body wall surface 15a at each side of the hatch opening. Securing of the clamping lip 110 and its end extensions 110a is accomplished by means of a pair of relatively flexible attachment plates 111 and 112 in a manner similar to that for attaching the side portion of the bellows assembly to the hatch opening as previously described. These attachment plates 111 and 112 are disposed at opposite sides of the clamping lip 110 and 110a and are secured thereto by suitable fastening devices such as rivets 113 which are positioned in relatively spaced relationship throughout the length of those attachment plates. Advantageously, the attachment plates 111 and 112 may be formed as integral continuations of the plates 67 and 68 which are incorporated in the side attachment components. A resilient sealing gasket 114 is affixed to the outer exposed surface of the one attachment plate 112 and is thus interposed between that plate and the surfaces 15a and 15b of the automobile body wall at the hatch opening. Having reference to FIGS. 14 and 15, it will be noted that this body surface may have a different configuration and thus the sealing gasket 114 is preferably of a sufficient thickness and having a characteristic resilience to adapt to the various surface configurations of automobile bodies that may be encountered. Additionally, as previously stated, the clamping plates may be preformed as necessary to adapt to sharp bends that may be formed in a particular automobile body surface.

Detachably securing the bellows assembly by means of the attachment plates 111 and 112 to the body surfaces 15b are a plurality of pivotable latches 115 and spring steel clips 116. Referring to FIGS. 13 and 14, it will be seen that the pivotable latches comprise a Z-shaped plate having one leg 117 thereof secured to the body surface 15b by a fastening device such as a self-tapping screw 118. The opposite leg 119 is thus disposed in offset relationship to the body wall surface 15b and is at a spaced distance therefrom to permit overlapping of the assembled attachment plates 111 and 112, clamping lip 110 and the sealing gasket 114. The space provided by this offset is such that when the latch is pivoted to the position illustrated in full lines of FIGS. 13 and 14, it will tend to compress this sealing gasket against the body surface. Two such pivotable latches are provided at each of the opposite sides of the hatch opening as indicated in FIG. 13. Two of the spring steel clips 116 are also provided and are positioned intermediate the latches and are operative to hold the bellows assembly against the body surface at the central area of the hatch opening. Each of the spring steel clips includes a U-shaped element 120 adapted to interfit over the top edge of the body structure at the hatch opening. This body structure, as can be best seen in FIG. 15, may comprise sheet metal elements which form a horizontally extending, upwardly projecting edge and is provided along the upper portion thereof with a rubber seal 121 that cooperates with the door 16. The other portions of the steel clip 116 include a clamping leg 122 which extends vertically in spaced relationship to the body surface and is interconnected to the U-shaped element by a horizontally extending plate 123. As in the case of the pivotable latches, the plate 123 is of a length to position the clamping leg 122 at a relative location to the body surface 15b so as to effect compressing of the sealing gasket 114 against that surface.

As previously indicated, attachment of the bellows assembly 46 to the trailer 10 is by relatively permanent means. A typical attachment is illustrated in FIG. 16 and which attachment, while specifically illustrated for the vertical section of bellows assembly that is immediately adjacent the outboard edge of the trailer's front section 31, is also utilized with the transversely extending sections at the top and bottom of the bellows assembly. Referring to FIG. 16, it will be seen that the trailer 10 is provided with an interior L-shaped structural member 124 to which the relatively thin outer body-forming shell of the trailer is secured. This is illustrated in FIG. 16 by the side 28 and the front section 31. Attachment of the bellows assembly is effected through the endmost pleat 125 which extends relatively inward from the extreme outboard corner of the trailer at the juncture of the side 28 at the front section 31. A clamping plate 126 is disposed adjacent one surface of the endmost pleat 125 and serves to clamp that pleat to the front section. A sealing gasket 127 is interposed between the pleat and the front wall-defining or gasket mounting surfaces 45 of the front section 31 to assure that air, water and dirt will be prevented from intruding into the interior of the vehicle. A plurality of self-tapping screws 128 are provided in spaced relationship around the periphery of the clamping plate 126 and extend through the plate and endmost pleat 125 and the gasket 127 and are secured into the structural member 124 of the trailer.

The trailer 10 heretofore described and illustrated in substantial detail embodies a construction which includes a fixed axle and wheel set and a hitch assembly that provides for pivoting of the trailer relative to the towing automobile about both a vertical and a transversely extending horizontal axis. An alternative embodiment of a trailer 130 and its associated hitch assembly 131 is illustrated in FIG. 17 with this alternative embodiment incorporating castered wheel assemblies 132 and a hitch assembly 131 which has only a single axis of articulation with respect to a towing automobile. With castered wheel assemblies 132, it is only necessary to provide a hitch assembly with a single axis of movement as the castered wheels enable the trailer and towing automobile to accommodate turns.

Referring specifically to FIG. 17, it will be seen that the hitch assemby 131 is substantially similar to that previously illustrated and described and includes a rigid structural frame 133 that is substantially similar to the frame 50 previously described. This structural frame 133 includes a U-shaped bracket 134 having a transversely extending, horizontally disposed section 135 terminating at each end in upwardly extending attachment legs 136. Each of the attachment legs 136 has an attachment element 137 formed at the upper end thereof enabling mechanical attachment thereof to the chassis or structural frame of the towing automobile in the aforedescribed manner. This structural frame 133 is also provided with an L-shaped stabilizing bracket 138. Secured to the U-shaped bracket 134 is the transverse support bar 139 which carries a tongue assembly 140 of the trailer in the same manner as that previously described. The transverse support bar 139 is rigidly secured to the horizontal section 135 of theU-shaped bracket 133 as by means of a pair of bolt-type fastening elements 141 which prevent relative pivoting of the support bar about a vertical axis. Each end of the transverse support bar 139 is formed with upturned flanges 142 through which respective horizontally extending pivot pins 143 project for interconnecting the forward ends of respective tongue assembly arms 144. The two pivot pins 143 are aligned with respect to a transversely extending horizontal axis and thus permit swinging movement of the trailer in a vertical plane.

Support of the modified trailer for transport purposes is by two castered wheel assemblies 132 which are mounted on the trailer's chassis or unibody frame, portions of which are illustrated in FIG. 17 and generally designated by the numeral 145. Forming a part of this chassis are longitudinally extending beams 146 positioned adjacent respective sides of the trailer and on which a respective castered wheel assembly is mounted. Each castered wheel assembly includes a wheel 147, an axle bracket and mounting shaft 148 and a mounting bearing 149. Each mounting bearing 149 is mechanically secured in fixed relationship on a respective beam 146 with an end portion of the axle bracket and mounting shaft 148 being journalled therein for relative rotation about a vertical axis. The trailer body structure 150 ismodified from that shown in FIG. 1 by providing at each side of the trailer a wheel well 151 that is of sufficient size to permit castering to the extent of 360 degrees. To minimize loss of interior trailer compartment space, the wheels 147 are selected to be of the smallest practical size giving adequate consideration to design factors such as load carrying capability and bearing capability.

Providing of castered wheel assemblies results in an integrated trailer and towing automobile combination that has improved maneuverability as compared to the fixed wheel axle and hitch assembly with dual pivot axes of the first described embodiment. The hitch assembly is also relatively simplified, thus reducing cost and there is a reduction in the deflection experienced by the bellows.

The trailer embodiments have been described as being functional in combination with a towing automobile. However, a trailer of this invention may be occupied or otherwise utilized when detached from an automobile. The auxiliary supporting legs 27 at the front and rear of the trailer provide sufficient stability in maintaining the trailer in a horizontal position. When detached from an automobile, for either use or for storage, a closure member (not shown) would be applied to the front section and effectively cover the central opening 47. A particular structure for such a closure member nor its method of attachment is not disclosed in detail, although a suitable closure could be fabricated from a sheet of flexible material and attached to the bellows assembly 46.

It will be readily apparent from the foregoing detailed description of the trailer of this invention that a novel and extremely useful trailer is provided for use with the small sized passenger automobiles. The trailer structure through its integration with the automobile enables utilization of the combined interior spaces of the trailer and the towing automobile for more efficient use of the available space in relatively small vehicles. Configuring of the trailer so that it has exterior surfaces, particularly a top surface, that are effectively continuations of the towing automobile significantly enhances the aerodynamic efficiency of the combined trailer and automobile. Providing of a convertible top enables the size of the trailer to be minimized for transport while permitting expansion of the trailer's interior space when it is desired to occupy the trailer. Positioning of the hitch assembly so that the pivot point will be longitudinally intermediate the front portion of the trailer that extends over the towing automobile minimizes the extent of displacement of the trailer with respect to the automobile.

Having thus described this invention, what is claimed is:

1. A camping trailer comprising
   a chassis provided with wheeled running gear and including a tongue assembly projecting a distance forwardly, said tongue assembly having a vehicle hitch assembly carried at a forward end thereof for detachable interconnection of the trailer with a towing vehicle and enabling articulated movement therebetween, and
   a body structure adapted to form a closed housing for occupants in combination with a towing vehicle, said body structure having a front end portion which projects a distance forwardly to overlie said hitch assembly and a portion of the rear of a towing vehicle, and sealing means carried by the front end portion forming a peripheral seal around said end portion to form a fluid-impervious seal with cooperative surface portions of a towing vehicle and permitting articulation of the trailer relative to a towing vehicle, said front end portion including front surface elements defining a transversely extending front wall surface having a portion which inclines upwardly and forwardly toward a top of said trailer body structure at an angle with respect to a horizontal plane that is substantially the same as the angle of a rear end surface of a towing vehicle with which the trailer is adapted to be coupled, said front wall surface formed with an opening providing access in a substantially horizontal plane to the interior of the trailer and disposed within the confines of said peripheral seal, said opening being of a dimension and configuration to permit passage therethrough of an access door mounted on the rear end surface of a towing vehicle with which the trailer is adapted to be coupled and thereby permit integration of their respective interior spaces.

2. A trailer according to claim 1 wherein said hitch assembly is disposed at a point longitudinally intermediate of the inclined portion of said front wall surface.

3. A trailer according to claim 1 wherein said hitch assembly includes a horizontal pivot axis which permits relative swinging of the trailer in vertical plane about said horizontal pivot axis, said horizontal pivot axis being disposed at a point longitudinally intermediate of the inclined portion of said front wall surface.

4. A trailer according to claim 3 wherein said tongue assembly includes a pair of pivot connections that are laterally spaced apart a predetermined distance at the forward end of said tongue assembly; and said hitch assembly includes an elongated transverse support bar adapted to be interconnected with a towing vehicle and interconnected at its opposite ends to said tongue assembly pivot connections on said horizontal pivot axis.

5. A trailer according to claim 4 wherein said transverse support bar is provided with a pivot mount at each end thereof; and said tongue assembly pivot connections each comprise a longitudinally extending bar and a pivot pin securing said longitudinally extending bar to a respective pivot mount.

6. A trailer according to claim 4 wherein said tongue assembly includes a pair of elongated arms rigidly secured to said trailer chassis in laterally spaced, forwardly projecting relationship with the forward ends thereof forming said pivot connections detachably engageable with said hitch assembly support bar.

7. A trailer according to claim 6 wherein said tongue assembly arms are laterally spaced apart a distance substantially of the order of the transverse width of the trailer.

8. A trailer according to claim 1 wherein said hitch assembly includes a vertical pivot axis whereby the trailer may swing in a horizontal plane about said vertical pivot axis, said vertical pivot axis being disposed at a point longitudinally intermediate of the inclined portion of said front wall surface.

9. A trailer according to claim 8 wherein said hitch assembly includes a horizontal pivot axis which permits the trailer to swing in a vertical plane about said horizontal pivot axis, said horizontal pivot axis being disposed at a point longitudinally intermediate of the inclined portion of said front wall surface.

10. A trailer according to claim 9 wherein said horizontal and vertical pivot axes intersect.

11. A trailer according to claim 9 wherein said hitch assembly includes a structural mounting frame adapted to be rigidly secured to a frame structure of a towing vehicle and an elongated transverse support bar, said transverse support bar being pivotally connected to said structural mounting frame for swinging movement about said vertical axis.

12. A trailer according to claim 11 wherein said transverse support bar is provided with a pair of pivot mounts disposed in spaced relationship with said vertical axis substantially intermediate said pivot mounts; and said tongue assembly includes a pivot member pivotally secured to each respective pivot mount for swinging movement about said horizontal axis.

13. A trailer according to claim 11 wherein said structural mounting frame and said support bar include mechanically cooperative means for restraining said support bar against oscillatory movement in a plane parallel to and intersecting said vertical axis.

14. A trailer according to claim 1 wherein said hitch assembly is disposed at a point longitudinally intermediate of the horizontal extend of said front wall surface and said point is of the order of one-third of the horizontal extent of said front wall surface forwardly of the rear of such horizontal extent.

15. A trailer according to claim 1 wherein said sealing means comprises a flexible wall-forming assembly having a longitudinal length to project a sufficient distance from said trailer front wall surface to span the distance to a mating surface of a towing vehicle to which the trailer is adapted to be coupled, said wall-forming assembly provided at its forward end with circumferentially extending attaching means adapted for detachable securing to a surface of a towing vehicle.

16. A trailer according to claim 15 wherein said wall forming assembly is formed from a sheet of flexible material and said attaching means includes a semi-flexible clamping plate secured to the forward end of said sheet and said clamping plate is provided with latch means cooperatively interengageable with a towing vehicle to detachably maintain said clamping plate in sealing engagement with a surface of the towing vehicle.

17. A trailer according to claim 15 or 16 wherein said wall-forming assembly is secured to said trailer body structure to form an aerodynamically efficient continuation with longitudinal side walls of said body structure and top.

18. A trailer according to claim 15 wherein said flexible wall forming assembly comprises a flexible bellows.

19. A trailer according to claim 1 wherein a forwardmost edge of said front end portion is at a vertical elevation at least equal to that of the top of a towing vehicle with which the trailer is adapted to be coupled at the point of interconnection with such vehicle top, and said trailer body structure includes a top having a surface which slopes upwardly and rearwardly from the forwardmost edge of said front end portion to form and aerodynamically configured surface continuation relative to a towing vehicle to which the trailer is adapted to be coupled, said sealing means forming an intermediate transition surface therebetween.

20. A trailer according to claim 1 wherein said wheeled running gear is mounted on said chassis to result in the center of gravity of the trailer being located slightly forward of a plane passing through the center axis of said running gear.

21. A trailer according to claim 1 wherein said wheeled running gear includes at least one castered wheel assembly.

22. A trailer according to claim 1 wherein said wheeled running gear includes a pair of castered wheel assemblies, each such assembly being disposed adjacent a longitudinal side of said trailer body structure.

23. A trailer according to claim 21 or 22 wherein said hitch assembly includes only a horizontal pivot axis.

24. A trailer according to claim 23 wherein said tongue assembly includes a pair of pivot connections that are laterally spaced apart a predetermined distance at the forward end of said tongue assembly; and said hitch assembly includes an elongated transverse support bar adapted to be interconnected with a towing vehicle in fixed relationship thereto and interconnected at its opposite ends to said tongue assembly pivot connections on said horizontal pivot axis.

25. A trailer according to claim 24 wherein said transverse support bar is provided with a pivot mount at each end thereof; and said tongue assembly pivot connections each comprise a longitudinally extending bar and a pivot pin securing said longitudinally extending bar to a respective pivot mount.

26. A camping trailer comprising
a chassis provided with wheeled running gear and including a tongue assembly projecting a distance forwardly, said tongue assembly having a vehicle hitch assembly carried at a forward end thereof for detachable interconnection of the trailer with a towing vehicle and enabling articulated movement therebetween, said hitch assembly including a structural mounting frame adapted to be rigidly secured to a frame structure of a towing vehicle and an elongated support bar extending generally transversely of the trailer and pivotally connected thereto for relative swinging movement about a substantially horizontal axis and pivotally connected to said structural mounting frame for relative swinging movement about a substantially vertical axis whereby the trailer may swing in both vertical and horizontal planes with respect to a vehicle to which it may be attached, said structural mounting frame and said support bar including mechanically cooperative means for restraining said support bar against oscillatory movement in a plane parallel to and intersecting said vertical axis, and
a body structure adapted to form a closed housing for occupants in combination with a towing vehicle, said body structure having a front end portion which projects a distance forwardly to overlie said hitch assembly and a portion of the rear of a towing vehicle, and sealing means carried by the front end portion forming a peripheral seal around said end portion to form a fluid-impervious seal with cooperative surface portions of a towing vehicle and permitting articulation of the trailer relative to a towing vehicle.

27. A trailer according to claim 16 or 26 wherein said mechanically cooperative means comprises respective plates disposed in superposed relationship.

28. A camping trailer comprising
a chassis provided with wheeled running gear and including a tongue assembly projecting a distance forwardly, said tongue assembly having a vehicle hitch assembly carried at a forward end thereof for detachable interconnection of the trailer with a towing vehicle and enabling articulated movement therebetween, and
a body structure adapted to form a closed housing for occupants in combination with a towing vehicle, said body structure having a front end portion which projects a distance forwardly to overlie said hitch assembly and a portion of the rear of a towing vehicle, and sealing means carried by the front end portion forming a peripheral seal around said end portion to form a fluid-impervious seal with cooperative surface portions of a towing vehicle and permitting articulation of the trailer relative to a towing vehicle, said front end portion including front surface elements defining a transversely extending front wall surface, said front wall surface having a portion which inclines upwardly and forwardly toward a top of said trailer body structure at an angle with respect to a horizontal plane that is substantially the same as the angle of a rear end surface of a towing vehicle with which the trailer is adapted to be coupled with a forwardmost edge of said front end portion extending to a vertical elevation at least equal to that of the top of a towing vehicle with which the trailer is adapted to be coupled at the point of interconnection with such vehicle top, said trailer body structure including a top having a surface which slopes upwardly and rearwardly from the forwardmost edge of said front end portion to form an aerodynamically configured surface continuation relative to a towing vehicle to which the trailer is adapted to be coupled, said sealing means forming an intermediate transition surface therebetween.

29. A trailer according to claim 19 or 28 wherein said top is selectively convertible between a lowered transport configuration presenting a minimum effective forwardly facing vertical surface component and raised configuration where said top surface is raised to a higher elevation, said convertible top including flexible wall members interconnecting with vertical walls of said body structure.

30. A trailer according to claim 29 wherein said top surface includes a front panel section having a front transverse edge pivotably connected to said body structure at a fixed elevation and is pivotable to a further upwardly inclined position when said top is displaced to said raised configuration.

31. A trailer according to claim 30 wherein top surface includes a rear panel section having a front transverse edge pivotably connected to a rear transverse edge of said front panel section, and said convertible top includes an operating mechanism which is operative to support said rear panel section substantially parallel as between its lowered and raised positions.

32. In combination,
a towing vehicle having an axle assembly, a chassis mounted on said axle assembly and a vehicle body carried on said chassis, said vehicle body including a rear end portion formed with an inclined rear wall having a surface which slopes upwardly and forwardly and in which wall an access opening is provided along with a door for selectively closing said access opening, said door being hinged to said vehicle body at the upper end of said access opening about a horizontal axis for vertical swinging movement between the closed position and an open position wherein the door is raised to at least a rearwardly extending horizontal position, and
a camping trailer comprising a chassis provided with wheeled running gear and including a tongue assembly projecting a distance forwardly therefrom and having a hitch assembly carried at a forward end thereof for detachable interconnection with said towing vehicle and enabling articulated movement therebetween, a trailer body structure adapted to form a closed housing for occupants in combination with said towing vehicle, said body structure having a front end portion which projects forwardly to overlie the access opening in the towing vehicle rear wall and which includes front surface elements defining a transversely extending front wall surface which is substantially complementary to the rear wall surface of said towing vehicle and is spaced a predetermined distance therefrom, and flexible sealing means carried by the front end portion of said trailer and extending forwardly into sealing engagement with said towing vehicle to thereby form a fluid-impervious seal therebetween and permit articulated movement of said trailer relative to said vehicle, said front end portion having an opening formed therein within the peripheral confines of said sealing means to permit swinging movement of said access door therethrough and integration of their respective interior spaces when said access door is swung to an open position.

33. The combination of claim 32 wherein a forwardmost edge of said front end portion is at a vertical elevation at least equal to that of the top of the towing vehicle at the point of interconnection therebetween, and said trailer body structure includes a top having a surface which slopes upwardly and rearwardly from said forwardmost edge to form an aerodynamically configured surface continuation of the towing vehicle's top, said sealing means forming an intermediate transition surface therebetween.

34. The combination of claim 32 wherein said hitch assembly is disposed at a point relatively forward of the extreme rear of the towing vehicle and longitudinally intermediate of that portion of the trailer front portion wich overlies the towing vehicle.

35. The combination of claim 34 wherein said point at which said hitch assembly is disposed is of the order of one-third of the horizontal extent of said front wall and located forwardly of the rear of such horizontal extent.

36. The combination of claim 34 wherein said hitch assembly includes a vertical pivot axis disposed centrally of the towing vehicle with respect to the longitudinal axis and a horizontal pivot axis, said tongue assembly pivoted on said horizontal axis at respective points disposed at opposite transverse sides of said vertical pivot axis.

37. The combination of claim 36 wherein said vertical and horizontal pivot axes are disposed in intersecting relationship.

38. The combination of claim 36 wherein said hitch assembly includes a structural mounting frame rigidly secured to said towing vehicle chassis and an elongated transverse support bar, said transverse support bar pivotally mounted on said mounting frame for swinging movement about said vertical axis, said tongue assembly pivotally connected to said transverse support bar for swinging movement about said horizontal axis.

39. The combination of claim 38 and which includes resilient biasing means interconnected between said trailer and said towing vehicle to resist relative pivoting movement about said vertical axis.

40. The combination of claim 39 wherein said biasing means includes spring means mechanically interconnected between said towing vehicle chassis and said transverse support bar.

41. The combination of claim 38 or 39 wherein said structural mounting frame and said transverse support bar comprise flat plates disposed in superposed relationship in a horizontal plane in contacting engagement with each other to resist pivoting movement therebetween in a plane extending through and parallel to the vertical pivot axis.

42. The combination of claim 32 wherein said wheeled running gear includes at least one castered wheel assembly.

43. The combination of claim 32 wherein said wheeled running gear includes a pair of castered wheel assemblies, each such assembly being disposed adjacent a longitudinal side of said trailer body structure.

44. The combination of claim 42 or 43 wherein said hitch assembly includes only a horizontal pivot axis.

45. The combination of claim 44 wherein said tongue assembly includes a pair of pivot connections that are laterally spaced apart a predetermined distance at the forward end of said tongue assembly; and said hitch assembly includes an elongated transverse support bar adapted to be interconnected with said towing vehicle in fixed relationship thereto and interconnected at its opposite ends to said tongue assembly pivot connections on said horizontal pivot axis.

46. The combination of claim 45 wherein said transverse support bar is provided with a pivot mount at each end thereof; and said tongue assembly pivot connections each comprise a longitudinally extending bar and a pivot pin securing said longitudinally extending bar to a respective pivot mount.

47. The combination of claim 32 wherein said flexible sealing means comprises a flexible wall-forming assembly secured to said towing vehicle and to said trailer body structure to form an aerodynamically efficient continuation of the respective surfaces thereof.

48. In combination,
a towing vehicle having an axle assembly, a chassis mounted on said axle assembly and a vehicle body carried on said chassis, said vehicle body including a rear end portion formed with an inclined rear wall having a surface which slopes upwardly and forwardly and in which wall an access opening is provided along with a door for selectively closing said access opening, said door being hinged to said vehicle body at the upper end of said access opening about a horizontal axis for vertical swinging movement between the closed position and an open position wherein the door is raised to at least a rearwardly extending horizontal position, and
a camping trailer comprising a chassis provided with wheeled running gear and including a tongue assembly projecting a distance forwardly therefrom and having a hitch assembly carried at a forward end thereof for detachable interconnection with said towing vehicle and enabling articulated movement therebetween, a trailer body structure adapted to form a closed housing for occupants in combination with said towing vehicle, said body structure having a front end portion which projects forwardly to overlie the access opening in the towing vehicle rear wall, and flexible sealing means carried by the front end portion of said trailer and extending forwardly into sealing engagement with said towing vehicle and to thereby form a fluid-impervious seal therebetween and permit articulated movement of said trailer relative to said vehicle, said front end portion having an opening formed therein within the peripheral confines of said sealing means to permit swinging movement of said access door therethrough, and a forwardmost edge of said front end portion is at a vertical elevation at least equal to that of the top of the towing vehicle at the point of interconnection therebetween, and said trailer body structure includes a top having a surface which slopes upwardly and rearwardly from said forwardmost edge to form an aerodynamically configured surface continuation of the towing vehicle's top, said sealing means forming an intermediate transition surface therebetween.

49. In combination,
a towing vehicle having an axle assembly, a chassis mounted on said axle assembly and a vehicle body carried on said chassis, said vehicle body including a rear end portion formed with an inclined rear wall having a surface which slopes upwardly and forwardly and in which wall an access opening is provided along with a door for selectively closing said access opening, said door being hinged to said vehicle body at the upper end of said access opening about a horizontal axis for vertical swinging movement between the closed position and an open position wherein the door is raised to at least a rearwardly extending horizontal position, and
a camping trailer comprising a chassis provided with wheeled running gear and including a tongue assembly projecting a distance forwardly therefrom and having a hitch assembly carried at a forward end thereof for detachable interconnection with said towing vehicle and enabling articulated movement therebetween, said hitch assembly including a vertical pivot axis disposed centrally of the towing vehicle with respect to the longitudinal axis enabling the trailer to swing relative to the towing vehicle about the vertical axis and including resilient biasing means interconnected between said trailer and said towing vehicle to resist relative pivoting movement about said vertical axis, and a trailer body structure adapted to form a closed housing for occupants in combination with said towing vehicle, said body structure having a front end portion which projects forwardly to overlie the access opening in the towing vehicle rear wall, and flexible sealing means carried by the front end portion of said trailer and extending forwardly into sealing engagement with said towing vehicle and to thereby form a fluid-impervius seal therebetween and permit articulated movement of said trailer relative to said vehicle, said front end portion having an opening formed therein within the peripheral confines of said sealing means to permit swinging movement of said access door therethrough.

50. In combination,
a towing vehicle having an axle assembly, a chassis mounted on said axle assembly and a vehicle body carried on said chassis, said vehicle body including a rear end portion formed with an inclined rear wall having a surface which slopes upwardly and forwardly and in which wall an access opening is provided along with a door for selectively closing said access opening, said door being hinged to said vehicle body at the upper end of said access opening about a horizontal axis for vertical swinging movement between the closed position and an open position wherein the door is raised to at least a rearwardly extending horizontal position, and
a camping trailer comprising a chassis provided with wheeled running gear and including a tongue assembly projecting a distance forwardly therefrom and having a hitch assembly carried at a forward end thereof for detachable interconnection with said towing vehicle and enabling articulated movement therebetween, said hitch assembly including a structural mounting frame rigidly secured to said towing vehicle chassis and an elongated support bar extending generally transversely of the trailer and pivotally connected to said mounting frame for relative swinging movement about a vertical pivot axis disposed centrally of the towing vehicle with respect to its longitudinal axis, said structural mounting frame and said support bar comprise flat plates disposed in superposed relationship in a horizontal plane in contacting engagement with each other to resist pivoting movement therebetween in a plane extending through said parallel to the vertical pivot axis, and a trailer body structure adapted to form a closed housing for occupants in combination with said towing vehicle, said body structure having a front end portion which projects forwardly to overlie the access opening in the towing vehicle rear wall, and flexible sealing means carried by the front end portion of said trailer and extending forwardly into sealing engagement with said towing vehicle and to thereby form a fluid-impervious seal therebetween and permit articulated movement of said trailer relative to said vehicle, said front end portion having an opening formed therein within the peripheral confines of said sealing means to permit swinging movement of said access door therethrough.

* * * * *